US012064936B2

(12) United States Patent
Hamlin et al.

(10) Patent No.: US 12,064,936 B2
(45) Date of Patent: Aug. 20, 2024

(54) SHEET MATERIAL DRIVE ROLLERS HAVING CIRCUMFERENCES WITH CURVED PROFILES

(71) Applicant: Sealed Air Corporation (US), Charlotte, NC (US)

(72) Inventors: Christopher C. Hamlin, Worcester, MA (US); Thomas P. Orsini, Sterling, MA (US); Russell T. Christman, Dunstable, MA (US)

(73) Assignee: Sealed Air Corporation (US), Charlotte, NC (US)

( * ) Notice: Subject to any disclaimer, the term of this patent is extended or adjusted under 35 U.S.C. 154(b) by 141 days.

(21) Appl. No.: 17/642,264

(22) PCT Filed: Sep. 10, 2020

(86) PCT No.: PCT/US2020/050036

§ 371 (c)(1),
(2) Date: Mar. 11, 2022

(87) PCT Pub. No.: WO2021/050619

PCT Pub. Date: Mar. 18, 2021

(65) Prior Publication Data

US 2022/0324192 A1 Oct. 13, 2022

Related U.S. Application Data

(60) Provisional application No. 62/899,764, filed on Sep. 13, 2019.

(51) Int. Cl.
*B31D 5/00* (2017.01)

(52) U.S. Cl.
CPC .... *B31D 5/0052* (2013.01); *B31D 2205/0023* (2013.01); *B31D 2205/0082* (2013.01)

(58) Field of Classification Search
CPC .. B31D 5/0052; B31D 5/0043; B31D 5/0039; B31D 2205/0082; B31D 2205/0023
See application file for complete search history.

(56) References Cited

U.S. PATENT DOCUMENTS 3,771,783 A * 11/1973 McInerny ................ B05C 1/04 271/125
5,738,621 A 4/1998 Simmons
(Continued)

FOREIGN PATENT DOCUMENTS

CN 108000951 A 5/2018
EP 1837298 A1 9/2007
(Continued)

OTHER PUBLICATIONS

Espacenet machine translation of Takahashi to JP S60106748 A (Year: 1985).*

*Primary Examiner* — Anna K Kinsaul
*Assistant Examiner* — Himchan Song
(74) *Attorney, Agent, or Firm* — Jon M. Isaacson

(57) ABSTRACT

A drive system is configured to feed a sheet material. The drive system includes a first roller and a second roller. A circumference of the first roller has a first curved profile. A circumference of the second roller has a second curved profile. The first and second rollers are arranged such that, when the sheet material is not located between the first and second rollers, the first curved profile of the first roller contacts the second curved profile of the second roller. The first and second rollers are further arranged such that, when the sheet material is located between the first and second rollers, rotation of at least one of the first and second rollers causes the sheet material to be fed through the drive system.

20 Claims, 14 Drawing Sheets

(56) References Cited

U.S. PATENT DOCUMENTS

| | | | | |
|---|---|---|---|---|
| 6,076,764 | A | 6/2000 | Robinson | |
| 6,632,165 | B1 | 10/2003 | Letourneau et al. | |
| 7,955,245 | B2 | 6/2011 | Cheich et al. | |
| 2017/0313016 | A1* | 11/2017 | Schalk | B31D 5/0039 |
| 2020/0070459 | A1* | 3/2020 | Schalk | B31D 5/0052 |

FOREIGN PATENT DOCUMENTS

| | | | | |
|---|---|---|---|---|
| GB | 939351 | A | | 10/1963 |
| JP | 60106748 | A | * | 6/1985 |
| JP | S60106748 | A | | 6/1985 |
| WO | 9727136 | A1 | | 7/1997 |

* cited by examiner

SHEET MATERIAL DRIVE ROLLERS HAVING CIRCUMFERENCES WITH CURVED PROFILES

BACKGROUND

The present disclosure is in the technical field of drive systems for sheet materials, such as paper. More particularly, the present disclosure is directed to drive systems that include rollers having circumference with curved profiles and arranged such that the curved profile of one roller contacts the curved profile of another roller when the sheet material is not located between the two rollers.

Machines for producing void fill material from paper are well-known in the art. Such machines generally operate by pulling a web of paper from a roll or fanfold paper, manipulating the paper web in such a way as to convert the paper into void fill material, and then severing the converted material into cut sections of a desired length.

While such machines are widely used and have been commercially successful, in many applications, there is a need for improved functionality. For example, when paper is fed through these machines, the drive systems tend to pull the paper in such a way that can cause the paper to rip or tear. Additionally, the paper can become easily misaligned while being fed by the drive systems. Traditional approaches to reducing these issues can greatly increase the cost of the drive systems. It would be advantageous to have a drive system that address the issues of damaging and misaligning the paper as the paper is fed by the drive system without significantly increasing the cost of the drive system.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In a first embodiment, a dunnage conversion machine includes a source of sheet material and a conversion system. The sheet material is in a substantially flat configuration in the source of the sheet material. The conversion system is configured to convert the sheet material from the substantially flat configuration into a non-flat configuration. The conversion system includes a drive system configured to draw the sheet material from the source and through the conversion system. The drive system comprises a first roller and a second roller, where a circumference of the first roller has a first curved profile and a circumference of the second roller has a second curved profile. The first and second rollers are arranged such that, when the sheet material is not located between the first and second rollers, the first curved profile of the first roller contacts the second curved profile of the second roller. When the sheet material is located between the first and second rollers, the drive system is configured to feed the sheet material through the drive system by rotating at least one of the first and second rollers.

In a second embodiment, the first and second rollers of the first embodiment are molded elastomer wheels.

In a third embodiment, the molded elastomer wheels of the second embodiment are molded urethane wheels.

In a fourth embodiment, the dunnage conversion machine of the first embodiment further includes a biasing mechanism configured to bias the first roller toward the second roller.

In a fifth embodiment, the biasing mechanism of the fourth embodiment includes a compression spring coupled between an axle of the first roller and an axle of the second roller.

In a sixth embodiment, the axle of the first roller of the fifth embodiment is capable of moving with respect to the axle of the second roller such that the axles of the first and second rollers remain substantially parallel to each other.

In a seventh embodiment, the axle of the first roller of the sixth embodiment is capable of moving with respect to the axle of the second roller within a range that permits multiple plies of the sheet material to pass between the first roller and the second roller.

In an eighth embodiment, the axle of the second roller of any of the fifth to seventh embodiments is coupled to a motor and the motor is configured to drive rotation of the axle of the second roller and rotation of the second roller.

In a ninth embodiment, the first roller of the eight embodiment is capable of spinning freely, and a force imparted by the biasing mechanism on the axle of the first roller causes the first roller to contact one of the sheet material or the second roller such that the first and second rollers counter-rotate when rotation of the second roller is driven by the motor.

In a tenth embodiment, the biasing mechanism of any of the fourth to ninth embodiments is capable of being disengaged while the sheet material is initially fed between the first and second rollers.

In an eleventh embodiment, when the sheet material is not located between the first and second rollers of any of the preceding embodiments, a point on first roller that is in contact with the second curved profile of the second roller is tangent to a two-dimensional tangent plane and a point on the second roller that is in contact with the first curved profile of the first roller is tangent to the two-dimensional tangent plane.

In a twelfth embodiment, the two-dimensional tangent plane of the eleventh embodiment is substantially perpendicular to an axis plane and the axis plane passes through an axis of the first roller and an axis of the second roller.

In a thirteenth embodiment, the sheet material of any of the preceding embodiments is Kraft paper.

In a fourteenth embodiment, in the source of the sheet material of the thirteenth embodiment, the Kraft paper is either in a fanfolded stack or on a roll.

In a fifteenth embodiment, a drive system for feeding a sheet material includes a first roller and a second roller. A circumference of the first roller has a first curved profile and a circumference of the second roller has a second curved profile. The first and second rollers are arranged such that (i) when the sheet material is not located between the first and second rollers, the first curved profile of the first roller contacts the second curved profile of the second roller, and (2) when the sheet material is located between the first and second rollers, rotation of at least one of the first and second rollers causes the sheet material to be fed through the drive system.

In a sixteenth embodiment, the first and second rollers of the fifteenth embodiment are aligned such that, when the sheet material is not located between the first and second rollers, a point on first roller that is in contact with the second curved profile of the second roller is on the maximum circumference of the first roller and a point on the second roller that is in contact with the first curved profile of the first roller is on the maximum circumference of the second roller.

In a seventeenth embodiment, the first and second rollers of any of the fifteenth or sixteenth embodiments are offset such that, when the sheet material is not located between the first and second rollers, a point on first roller that is in contact with the second curved profile of the second roller is on not on the maximum circumference of the first roller and a point on the second roller that is in contact with the first curved profile of the first roller is not on the maximum circumference of the second roller.

In an eighteenth embodiment, the first roller of the seventeenth embodiment is on a first axle and the second roller is on a second axle. The drive system further includes a third roller on the second axle, where a circumference of the third roller has a third curved profile. The first and third rollers are arranged such that, when the sheet material is not located between the first and third rollers, the first curved profile of the first roller contacts the third curved profile of the third roller.

In a nineteenth embodiment, when the sheet material is not located between the first roller and the second and third rollers in the eighteenth embodiment, the second and third curved profiles contact the first curved profile on opposite sides of the maximum circumference of the first roller.

In a twentieth embodiment, the first and second axles of any of the eighteenth or nineteenth embodiments are substantially parallel to each other.

In a twenty first embodiment, the drive system of any of the fifteenth to twentieth embodiments further includes a biasing mechanism configured to bias the first roller toward the second roller.

In a twenty second embodiment, the first and second rollers of the any of the fifteenth to twenty first embodiments are molded elastomer wheels.

BRIEF DESCRIPTION OF THE DRAWING

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

The present disclosure describes embodiments of drive systems for sheet materials. In some embodiments, the drive systems include rollers having circumference with curved profiles. The rollers are arranged such that the curved profile of one roller contacts the curved profile of another roller when the sheet material is not located between the two rollers. The drive systems can be used to feed sheet material, such as paper, through dunnage conversion machines.

Figure 1A:
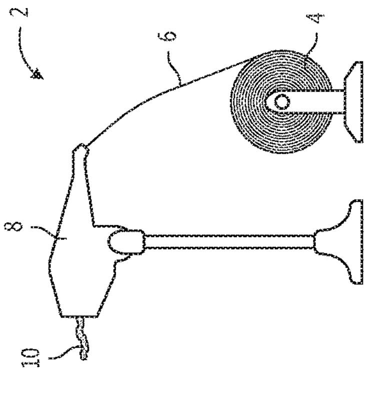
FIGS. 1A and 1B depict embodiments of dunnage conversion systems that include a source of sheet material and a conversion system, in accordance with the embodiments discussed herein.

Depicted in FIG. 1A is an embodiment of a dunnage conversion system 2. The dunnage conversion system 2 includes a source 4 of sheet material 6. In the depicted embodiment, the source 4 is a roll of the sheet material 6. In some embodiments, the sheet material 6 is a paper-based material, such as Kraft paper. In the source 4, the sheet material 6 is in a substantially flat configuration. For example, the roll may hold a single ply of Kraft paper that is flat across the width of the roll. In another example, the roll may hold multi-ply sheet material where each ply is flat across the width of the roll. In another example, a single sheet of paper may be folded longitudinally so that the paper on either side of the fold is flat and the paper is rolled such that the longitudinal fold is on one side of the roll and the two longitudinal edges are on the other side of the of roll. Many other variations of the source 4 of the sheet material 6 in the form of a roll are possible.

The dunnage conversion system 2 includes a dunnage conversion machine 8. The dunnage conversion machine 8 is configured to configured to convert the sheet material from the substantially flat configuration of the sheet material 6 into a non-flat configuration of a pad 10. In some embodiments, the sheet material 6 is Kraft paper and the dunnage conversion machine 8 is configured to manipulate the Kraft paper in such a way as to convert the paper into the pad 10 that can serve as a low-density void fill material. In some embodiments, the dunnage conversion machine 8 includes a severing mechanism to cut the pad 10 at intervals to form individual pads. In some embodiments, the dunnage conversion machine 8 further includes a drive system configured to feed (e.g., pull) the sheet material 6 from the source 4 into the dunnage conversion machine 8 and to feed the sheet material 6 through the dunnage conversion machine 8 as the sheet material 6 is converted into the pad 10.

Figure 1B:
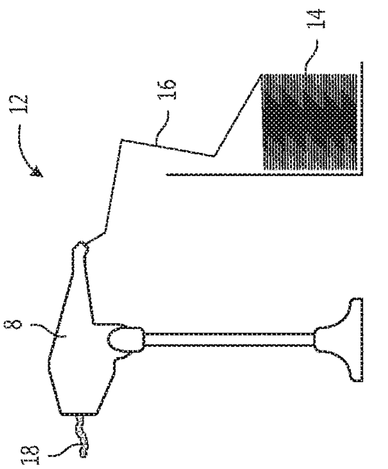

Depicted in FIG. 1B is an embodiment of a dunnage conversion system 12. The dunnage conversion system 12 includes a source 14 of sheet material 16. In the depicted embodiment, the source 14 is a fanfolded stack of the sheet material 16. In some embodiments, the sheet material 16 is a paper-based material, such as Kraft paper. In the source 14, the sheet material 16 is in a substantially flat configuration. For example, the fanfolded stack may hold a single ply of Kraft paper that is flat between the transverse folds and across the width of the fanfolded stack. In another example, the fanfolded stack may hold multi-ply sheet material where each ply is flat between the transverse folds and across the width of the fanfolded stack. Many other variations of the source 4 of the sheet material 6 in the form of a fanfolded stack are possible. The dunnage conversion machine 8 in the dunnage conversion system 12 is the same as the dunnage conversion machine 8 in the dunnage conversion system 2 and is capable of converting the sheet material 16 into the pad 10.

Figure 1C:
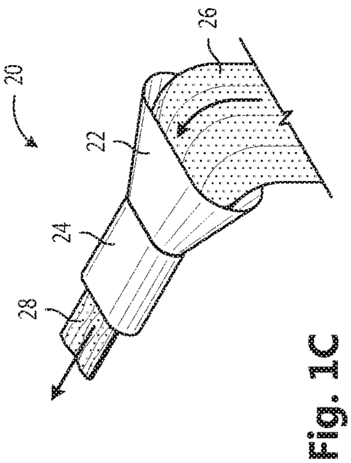
FIG. 1C depicts an embodiment of a conversion system that can be included in a dunnage conversion machines, in accordance with the embodiments discussed herein.

Depicted in FIG. 1C is an embodiment of a conversion system 20 that can be included in any of the dunnage conversion machines described herein, including the dunnage conversion machine 8. The conversion system 20 includes a funneling device 22 and a drive system 24. The funneling device 22 is configured to receive the sheet material 26 and begin deforming the sheet material 26. In the depicted embodiment, the sheet material 26 is in a substantially flat configuration upstream of the funneling device 22. In some embodiments, the funneling device 22 may cause the sheet material 26 to curl, fold, or otherwise deform before the sheet material 26 reaches the funneling device 22. The drive system 24 is configured to draw the sheet material 26 from a source (e.g., a roll or a fanfolded stack) and through the conversion system 20. In some embodiments, the drive system 24 is configured to further deform the sheet material 26 as the sheet material 26 passes through the drive system 24. After the sheet material 26 passes through the conversion system 20, the sheet material 26 exists the conversion system 20 in a non-flat configuration. In the depicted embodiment, the sheet material 26 exists the conversion system 20 in a non-flat configuration in the form of a pad 28.

Figure 2A:
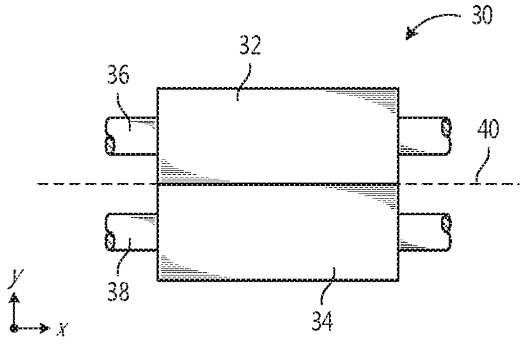
FIGS. 2A and 2B depict front and side views, respectively, of a type of drive system in existing paper dunnage machines.
Figure 2B:
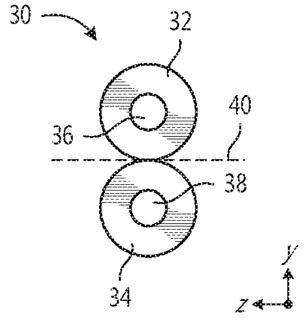

Existing paper dunnage machines include drive systems. FIGS. 2A and 2B depict front and side views, respectively, of an embodiment of a drive system 30. The drive system 30 is a double-cylinder roller type drive system. The drive system includes cylindrical rollers 32 and 34. The cylindrical roller 32 is on an axle 36 and the cylindrical roller 34 is on an axle 38. The axles 36 and 38 extend axially in the x-direction and are axially parallel to each other. The cylindrical rollers 32 and 34 are each tangent to the xz-plane 40 in a single direction. In the depicted embodiment, the cylindrical rollers 32 and 34 are tangent to the xz-plane 40 in the z-direction (as can be seen in FIG. 2B) but not in the x-direction (as can be seen in FIG. 2A). The sheet material passes between the cylindrical rollers 32 and 34. At least one of the cylindrical rollers 32 and 34 is driven such that the cylindrical rollers 32 and 34 counterrotate to feed the sheet material.

Figure 3A:
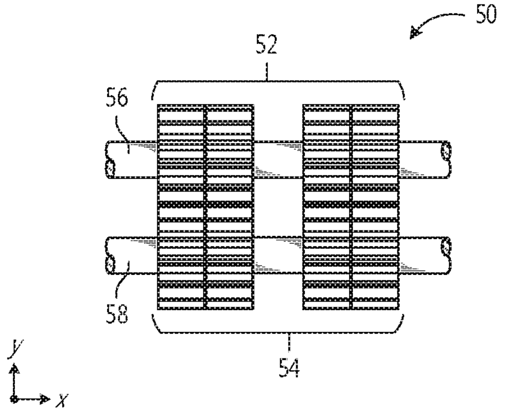
FIGS. 3A and 3B depict front and side views, respectively, of another type of drive system in existing paper dunnage machines.
Figure 3B:
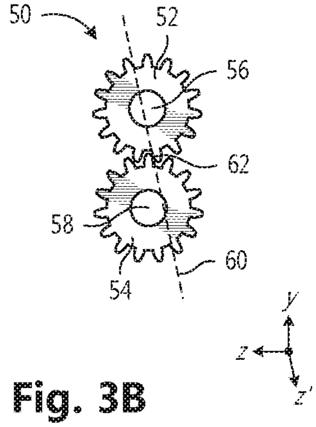

FIGS. 3A and 3B depict front and side views, respectively, of an embodiment of a drive system 50. The drive system 50 is a double-spur-gear roller type drive system. The drive system includes spur gears 52 and 54. The spur gears 52 are on an axle 56 and the spur gears 54 are on an axle 58. The axles 56 and 58 extend axially in the x-direction and are axially parallel to each other. The teeth of the spur gears 52 and 54 contact each other at a pinch point 62. At the pinch point 62, the teeth of the spur gears 52 and 54 are each tangent to the xz'-plane 60 in a single direction. In the depicted embodiment, the teeth of the spur gears 52 and 54 at the pinch point 60 are tangent to the xz'-plane 60 in the z'-direction (as can be seen in FIG. 3B) but not in the x-direction. The sheet material passes between the spur gears 52 and 54. At least one of the spur gears 52 and 54 is driven such that the spur gears 52 and 54 counterrotate to feed the sheet material.

Existing paper dunnage machines are widely used and have been commercially successful. However, the drive systems in existing paper dunnage machines suffer from drawbacks. For example, the drive systems tend to pull the paper in such a way that can cause the paper to rip or tear. Additionally, the paper can become easily misaligned while being fed by the drive systems. For example, in the drive system 30, paper is typically fed between the cylindrical rollers 32 and 34 in the negative z-direction. However, if the paper is fed even at a slight angle with respect to the negative z-direction, the paper will tend to migrate to one side of the cylindrical rollers 32 and 34 as the paper is fed. In the depicted embodiment, the paper tends to migrate in the x-direction or the negative x-direction to one of the sides of the cylindrical rollers 32 and 34. Similarly, in the drive system 50, paper is typically fed between the spur gears 52 and 54 in the negative z-direction. However, if the paper is fed even at a slight angle with respect to the negative z-direction, the paper will tend to migrate to one side of the spur gears 52 and 54 as the paper is fed. In the depicted embodiment, the paper tends to migrate in the x-direction or the negative x-direction to one of the sides of the spur gears 52 and 54. Such a misalignment of the paper to one side of the drive system can cause the paper to rip or tear as the drive system continues to operate.

Traditional approaches to reducing these drive system issues can greatly increase the cost of the drive systems. For example, in drive system 30, non-standard rollers can be developed to reduce the possibility of misalignment. However, non-standard rollers can be expensive, causing the drive system 30 and thus the paper dunnage machines to be more expensive. In another example, in drive system 50, gears other than spur gears (e.g., helical gears, etc.) used in an attempt to control the alignment of the paper. However, such gears can be expensive and can create other difficulties, such as axial thrust and the need for bearings to be added to the system. It would be advantageous for a drive system to address the issues of damaging and misaligning the paper as the paper is fed by the drive system without increasing the cost of the drive system.

Described herein are embodiments of drive systems that can be included in conversion systems of dunnage conversion machines. In some embodiments, the drive systems are configured to draw a sheet material from a source of sheet material in the dunnage conversion machine. In some embodiments, the sheet material is paper, such as Kraft paper. In some embodiments, the drive systems include at least two rollers that that have circumferences with curved profiles. In some examples, the rollers are molded elastomer wheels, such as molded urethane wheels, that are easily and relatively inexpensively available. When the sheet material is not located between the rollers, the curved profiles of the rollers contact each other such that the rollers are tangent in two-dimensions to a plane that passes between the rollers.

When the sheet material is located between the rollers, the drive system is configured to feed the sheet material through the drive system by rotating at least one of the rollers.

Figure 4B:
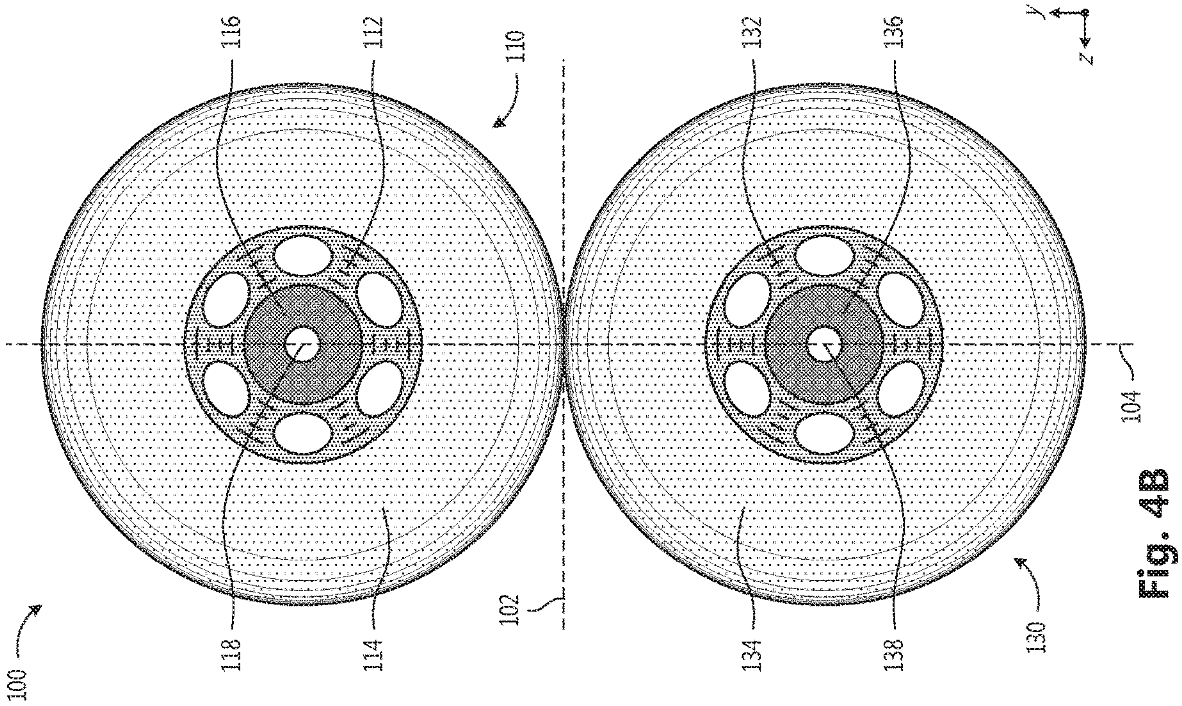
FIGS. 4A and 4B depict front and side views, respectively, of an embodiment of a drive system with rollers that are substantially aligned, in accordance with the embodiments discussed herein.
Figure 4A:
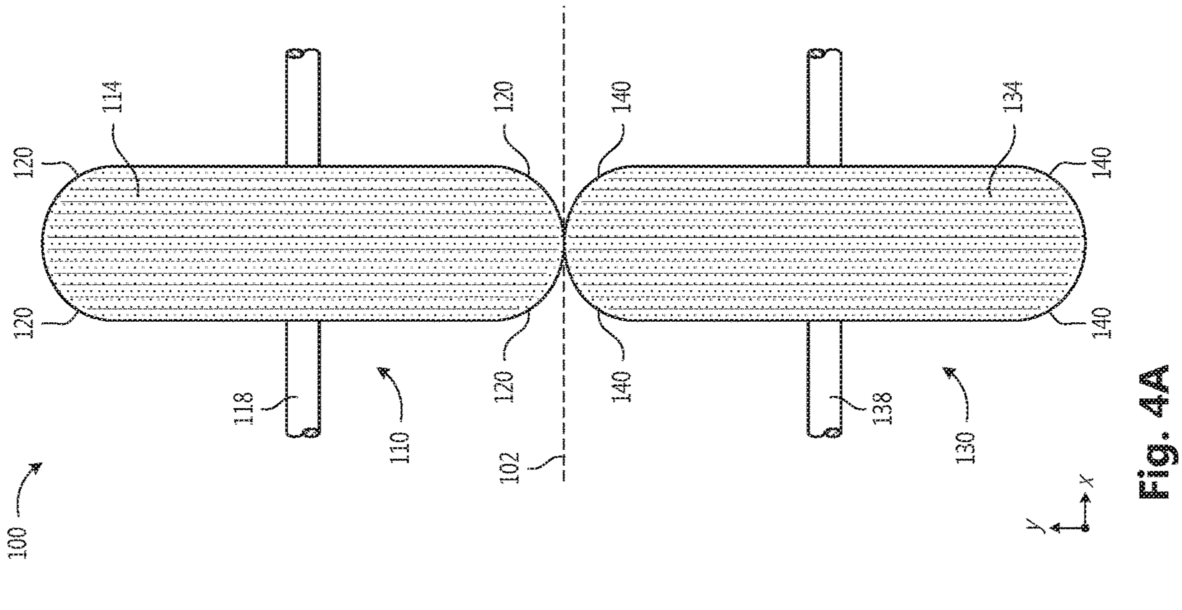

FIGS. 4A and 4B depict front and side views, respectively, of an embodiment of a drive system 100. The drive system 100 includes a roller 110 and a roller 130. Each of the rollers 110 and 130 is in the form of a wheel. The roller 110 includes a wheel hub 112, a contact material 114, and couplers 116. Similarly, the roller 130 includes a wheel hub 132, a contact material 134, and couplers 136. In some embodiments, the wheel hubs 112 and 132 are formed from a rigid material, such as a metal. In some embodiments, the contact materials 114 and 134 are made from a resilient material, such as an elastomer. For example, the contact materials 114 and 134 can be made from urethane or polyurethane. In some embodiments, the contact materials 114 and 134 are made from an elastomer having a durometer hardness in a range from about 72 A to about 98 A, when measured according to ASTM D2240. The couplers 116 and 136 are configured to couple the rollers 110 and 130 to axles. In the depicted embodiment, the roller 110 is on an axle 118 and the roller 130 is on an axle 138. In some embodiments, the couplers 116 and 136 are bearings configured to reduce friction between the rollers 110 and 130 and axles on which the rollers 110 and 130 rotate.

As can be seen in FIG. 4A, a circumference of the roller 110 has a curved profile 120 and the circumference of the of the roller 130 has a curved profile 140. In the depicted embodiment, the curved profile 120 of the roller 110 and the curved profile 140 of the roller 130 have substantially similar shapes. When no sheet material is placed between the rollers 110 and 130, as is the case in FIGS. 4A and 4B, the curved profile 120 of the roller 110 is in contact with the curved profile 140 of the roller 130. If a sheet material, such as paper, were inserted between the rollers 110 and 130, the drive system 100 is configured to feed the sheet material by rotating at least one of the rollers 110 and 130.

The axles 118 and 138 extend axially in the x-direction and are axially parallel to each other. The rollers 110 and 130 are each tangent to a two-dimensional tangent plane 102 in two directions. In the depicted embodiment, the two-dimensional tangent plane 102 is the xz-plane and the rollers 110 and 130 are tangent to the two-dimensional tangent plane 102 in the x-direction (as can be seen in FIG. 4A) and in the z-direction (as can be seen in FIG. 4B). In some embodiments, the contact between the curved profiles 120 and 140 of the rollers 110 and 130 is called "tangent-tangent contact" because of the tangency in two directions or "point-tangent contact" because the point on the curved profile 120 that contacts the curved profile 140 and the point on the curved profile 140 that contacts the curved profile 120 are each tangent to the two-dimensional tangent plane 102. When a sheet material is located between the rollers 110 and 130, the drive system 100 is configured to feed the sheet material through the drive system 100 by rotating at least one of the rollers 110 and 130. When a sheet material is fed between the rollers 110 and 130 in the negative z-direction, the tangent-tangent contact of the curved profiles 120 and 140 of the rollers 110 and 130 permits the sheet material to migrate in both the x-direction and the negative x-direction as the sheet material is fed regardless of the angle at which the sheet material is fed into the rollers 110 and 130. In some cases, the drive system 100 has a tendency to center the sheet material in the x-direction as the sheet material is fed between the rollers 110 and 130 in the negative z-direction.

In the depicted embodiment, the axle 118 and the axle 138 are substantially parallel to each other. The axle 118 and the axle 138 are also substantially parallel to the two-dimensional tangent plane 102. FIG. 4B shows an axis plane 104 that passes through the axles 118 and 138 of the rollers 110 and 130 (e.g., the xy-plane). In the depicted embodiment, the two-dimensional tangent plane 102 is substantially perpendicular to the axis plane 104. In the depicted embodiment, the rollers 110 and 130 are aligned in the x-direction. As can be seen in FIG. 4A, the alignment of rollers 110 and 130 results in the point on roller 110 that is in contact with the curved profile 140 of the roller 130 is on the maximum circumference of the roller 110 and the point on the roller 130 that is in contact with the curved profile 120 of the roller 110 is on the maximum circumference of the roller 130. In other embodiments, rollers can be offset, examples of which are provided below.

In some embodiments, the rollers 110 and 130 are molded elastomer wheels, such as molded urethane wheels. Molded elastomer wheels are readily available as off-the-shelf parts because of their use in a number of products, such as inline skates, scooters, roller conveyors, casters, and the like. Not only are molded elastomer wheels readily available, they are also relatively inexpensive compared to other traditional rollers, such as cylindrical rollers, spur gears, and the like. Additionally, molded elastomer wheels are designed to withstand a variety of punishing physical environments without suffering fatal deformation. This allows molded elastomer wheels to be used for a long time without being replaced.

Figure 5A:
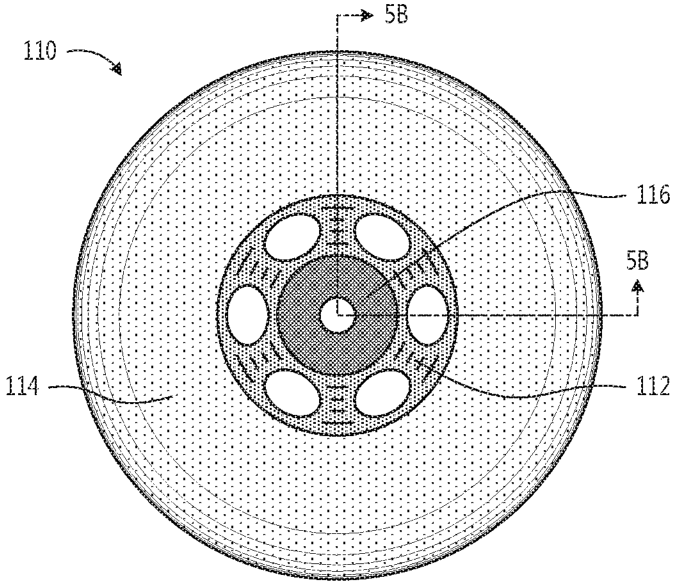
FIGS. 5A and 5B are side and front cross-section views, respectively, of one of the rollers from the drive system shown in FIGS. 4A and 4B, in accordance with the embodiments discussed herein.
Figure 5B:
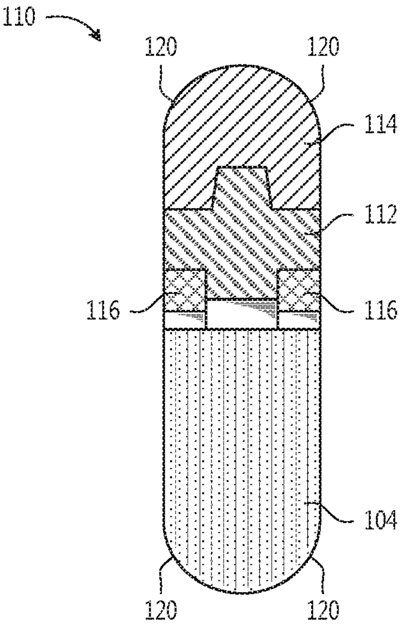

Depicted in FIGS. 5A and 5B are side and front cross-section views, respectively, of the roller 110 in the form of an elastomer wheel. In some embodiments, the roller 130 can have a similar cross-section as the cross-section of the roller 110 shown in FIG. 5B. As can be seen in FIG. 5B, the entire circumference of the roller 110 is curved. In other words, when viewing FIG. 5B, the curved profile 120 of the roller 110 extends from the left side of the roller 110 to the right side of the roller 110.

Figure 6A:
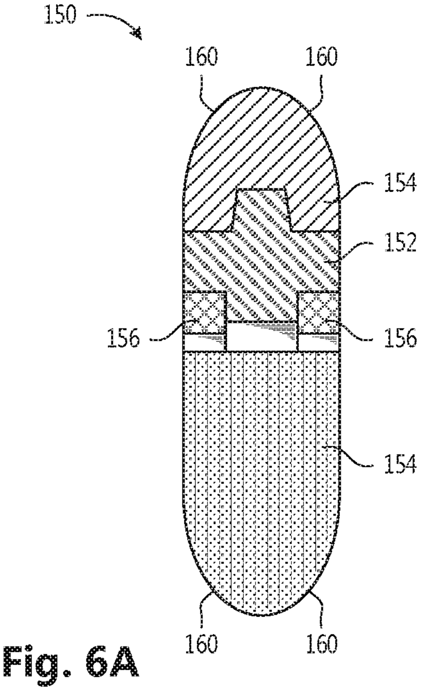
FIGS. 6A and 6B depict embodiments, respectively, of rollers that are variations of the roller shown in FIGS. 5A and 5B, in accordance with the embodiments discussed herein.
Figure 6B:
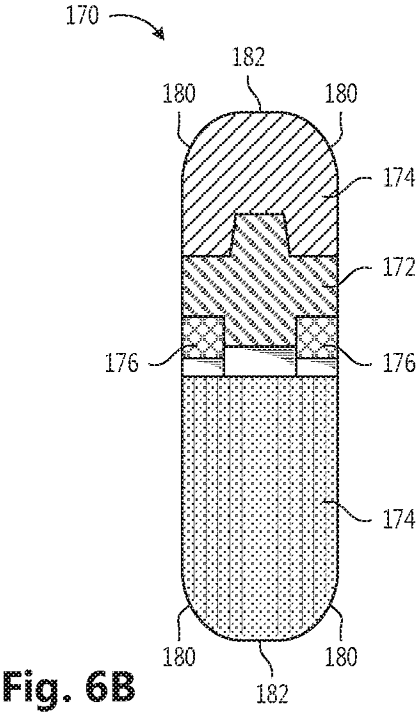

FIGS. 6A and 6B depict embodiments, respectively, of a roller 150 and a roller 170. The roller 150 includes a wheel hub 152, a contact material 154, and couplers 156. Similarly, the roller 170 includes a wheel hub 172, a contact material 174, and couplers 176. In some embodiments, the wheel hubs 152 and 172 are formed from a rigid material, such as a metal. In some embodiments, the contact materials 154 and 174 are made from a resilient material, such as an elastomer. For example, the contact materials 154 and 174 can be made from urethane or polyurethane. In some embodiments, the contact materials 154 and 174 are made from an elastomer having a durometer hardness in a range from about 72 A to about 98 A, when measured according to ASTM D2240. The couplers 156 and 176 are configured to couple the rollers 150 and 170 to axles. In some embodiments, the couplers 156 and 176 are bearings configured to reduce friction between the rollers 150 and 170 and axles on which the rollers 150 and 170 rotate.

A circumference of the roller 150 has a curved profile 160. Similar to the roller 110, the entire circumference of the roller 150 is curved. When viewing FIG. 6A, the curved profile 160 of the roller 150 extends from the left side of the roller 150 to the right side of the roller 150. The curved profile 160 of the roller 150 has a different curvature than the curved profile 120 of the roller 110. In particular, the curved profile 160 of the roller 150 is steeper than the curved profile 120 of the roller 110. The curved profile 160 of the roller 150 also extends down closer to the wheel hub 152 than the curved profile 120 of the roller 110 extends down to the wheel hub 112. A circumference of the roller 170 has a curved profile 180. Unlike the roller 110, the circumference of the roller 170 is not entirely curved. In particular, the circumference of the roller 170 includes a flat portion 182 between portions of the curved profile 180. When viewing FIG. 6B, a portion of the curved profile 180 of the roller 170 extends from the left side of the roller 170 to the flat portion 182 and another portion of the curved profile 180 of the roller 170 extends from the flat portion 182 to right side of the roller 170. In other embodiments, rollers that have circumferences with curved profiles, such as variations of the rollers 110, 130, 150, and 170, are possible and will be apparent to those skilled in the art.

Figure 7B:
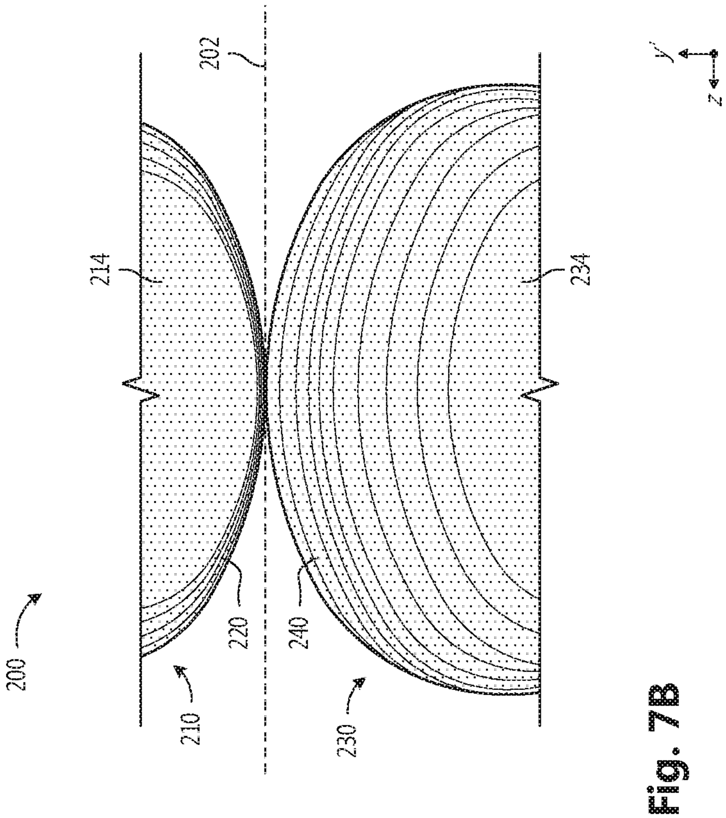
FIGS. 7A and 7B depict front and partial perspective views, respectively, of an embodiment of a drive system with rollers that are offset from each other, in accordance with the embodiments discussed herein.
Figure 7A:
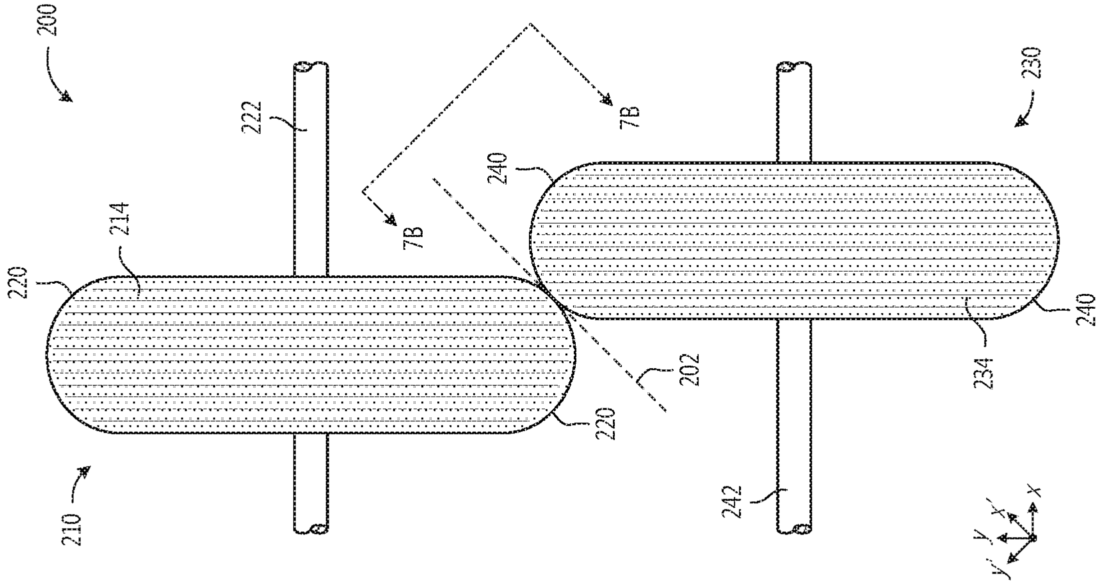

FIGS. 7A and 7B depict front and partial perspective views, respectively, of an embodiment of a drive system 200 with rollers that are offset from each other. The drive system 200 includes a roller 210 and a roller 230. Each of the rollers 210 and 230 is in the form of a wheel. The roller 210 includes a contact material 214 and the roller 230 includes a contact material 234. In some embodiments, the contact materials 214 and 234 are made from a resilient material, such as an elastomer. For example, the contact materials 214 and 234 can be made from urethane or polyurethane. In some embodiments, the harness of the contact materials 214 and 234 are made from an elastomer having a durometer hardness in a range from about 72 A to about 98 A, when measured according to ASTM D2240. In the depicted embodiment, the roller 210 is on an axle 222 and the roller 230 is on an axle 242. In some embodiments, the rollers 210 and 230 are molded elastomer wheels, such as molded urethane wheels. Molded elastomer wheels are readily available as off-the-shelf parts, are relatively inexpensive, and typically can be used for long periods of time without failing.

As can be seen in FIG. 7A, a circumference of the roller 210 has a curved profile 220 and the circumference of the of the roller 230 has a curved profile 240. In the depicted embodiment, the curved profile 220 of the roller 210 and the curved profile 240 of the roller 230 have substantially similar shapes. When no sheet material is placed between the rollers 210 and 230, as is the case in FIGS. 7A and 7B, the curved profile 220 of the roller 210 is in contact with the curved profile 240 of the roller 230. If a sheet material, such as paper, were inserted between the rollers 210 and 230, the drive system 200 is configured to feed the sheet material by rotating at least one of the rollers 210 and 230.

The axles 222 and 242 extend axially in the x-direction and are axially parallel to each other. The rollers 210 and 230 are each tangent to a two-dimensional tangent plane 202 in two directions. In the depicted embodiment, rollers 210 and 230 are offset so that the two-dimensional tangent plane 202 is the x'z-plane. The rollers 210 and 230 are tangent to the two-dimensional tangent plane 202 in the x'-direction (as can be seen in FIG. 7A) and in the z-direction (as can be seen in FIG. 7B). In some embodiments, the contact between the curved profiles 220 and 240 of the rollers 210 and 230 is called "tangent-tangent contact" because of the tangency in two directions or "point-tangent contact" because the point on the curved profile 220 that contacts the curved profile 240 and the point on the curved profile 240 that contacts the curved profile 220 are each tangent to the two-dimensional tangent plane 202. When a sheet material is located between the rollers 210 and 230, the drive system 200 is configured to feed the sheet material through the drive system 200 by rotating at least one of the rollers 210 and 230. When a sheet material is fed between the rollers 210 and 230 in the negative z-direction, the tangent-tangent contact of the curved profiles 220 and 240 of the rollers 210 and 230 permits the sheet material to migrate in both the x'-direction and the negative x'-direction as the sheet material is fed regardless of the angle at which the sheet material is fed into the rollers 210 and 230. In some cases, the drive system 200 has a tendency to center the sheet material in the x'-direction as the sheet material is fed between the rollers 210 and 230 in the negative z-direction.

In the depicted embodiment, the axle 222 and the axle 242 are substantially parallel to each other. In the depicted embodiment, the two-dimensional tangent plane 202 is substantially perpendicular to an axis plane that passes through the axles 222 and 242 of the rollers 210 and 230 (e.g., the xy-plane). In the depicted embodiment, the rollers 210 and 230 are offset in the x-direction. As can be seen in FIG. 7A, the offset of rollers 210 and 230 results in the point on roller 210 that is in contact with the curved profile 240 of the roller 230 not being on the maximum circumference of the roller 210 and the point on the roller 230 that is in contact with the curved profile 220 of the roller 210 not being on the maximum circumference of the roller 230.

Figure 8A:
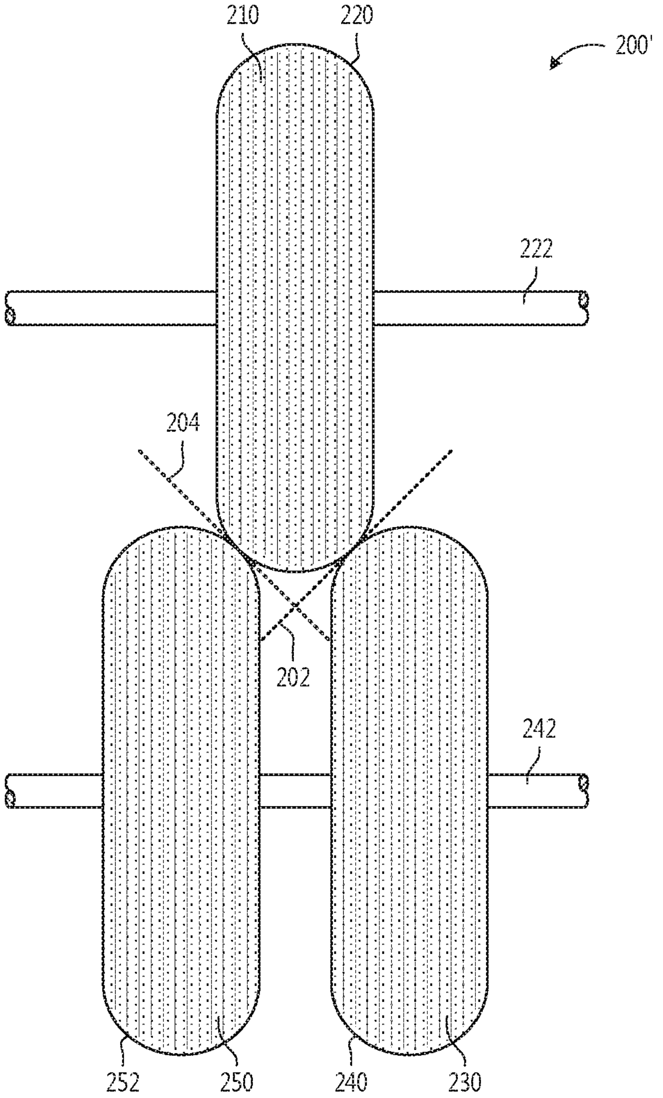
FIGS. 8A and 8B depict front views of embodiments of drive systems that are variations of the drive system shown in FIGS. 7A and 7B, in accordance with the embodiments discussed herein.

When some of the embodiments of drive systems described herein have two rollers, drive systems can have more than two rollers. Depicted in FIG. 8A is a front view of an embodiment of a drive system 200' that is a variation of the drive system 200. Like the drive system 200, the drive system 200' includes the roller 210 and the roller 230 on the axles 222 and 242, respectively. The drive system 200' further includes a roller 250 on the axle 242. The circumference of the roller 250 includes a curved profile 252. When no sheet material is placed between the rollers 210, 230, and 250, as is the case in FIG. 8A, the curved profile 252 of the roller 250 is in contact with the curved profile 220 of the roller 210. The rollers 210 and 250 are each tangent to a two-dimensional tangent plane 204 in two directions. If a sheet material, such as paper, were inserted between the rollers 210, 230, and 250, the drive system 200 is configured to feed the sheet material by rotating at least one of the rollers 210, 230, and 250. When no sheet material is placed between the rollers 210, 230, and 250, as is the case in FIG. 8A, the curved profiles 240 and 252 contact the curved profile 220 on opposite sides of the maximum circumference of the roller 210.

Figure 8B:
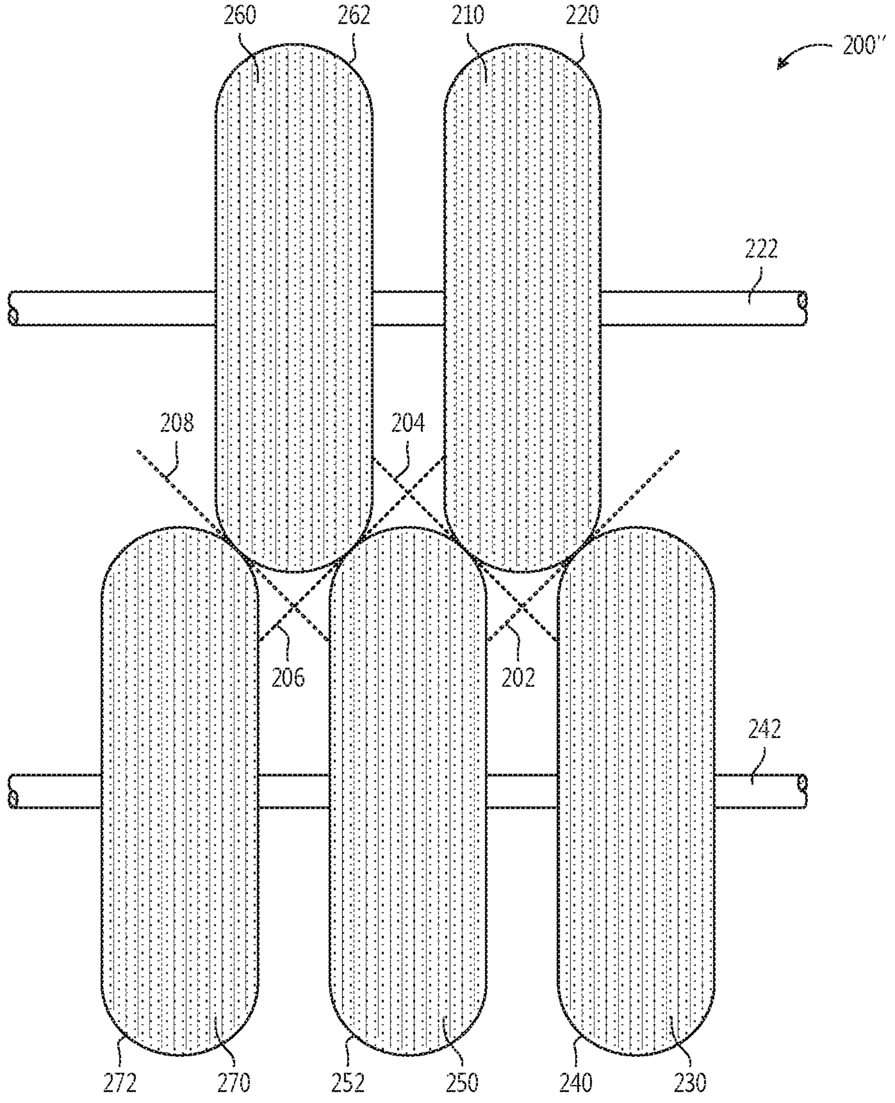

Depicted in FIG. 8B is a front view of an embodiment of a drive system 200" that is a variation of the drive system 200'. Like the drive system 200', the drive system 200" includes the roller 210 on the axle 222 and the rollers 230 and 250 are on the axle 242, respectively. The drive system 200" further includes a roller 260 on the axle 222 and a roller 270 on the axle 242. The circumference of the roller 260 includes a curved profile 262 and the circumference of the roller 270 includes a curved profile 272. When no sheet material is placed between the rollers 210, 230, 250, 260, and 270, as is the case in FIG. 8B, the curved profile 262 of the roller 260 is in contact with the curved profile 252 of the roller 250 and the curved profile 272 of the roller 270 is in contact with the curved profile 262 of the roller 260. The rollers 250 and 260 are each tangent to a two-dimensional tangent plane 206 in two directions. The rollers 260 and 270 are each tangent to a two-dimensional tangent plane 208 in two directions. If a sheet material, such as paper, were inserted between the rollers 210, 230, 250, 260, and 270, the drive system 200 is configured to feed the sheet material by rotating at least one of the rollers 210, 230, 250, 260, and 270. It will be apparent to those skilled in the art that any number of rollers could be used in a drive system.

Figure 9A:
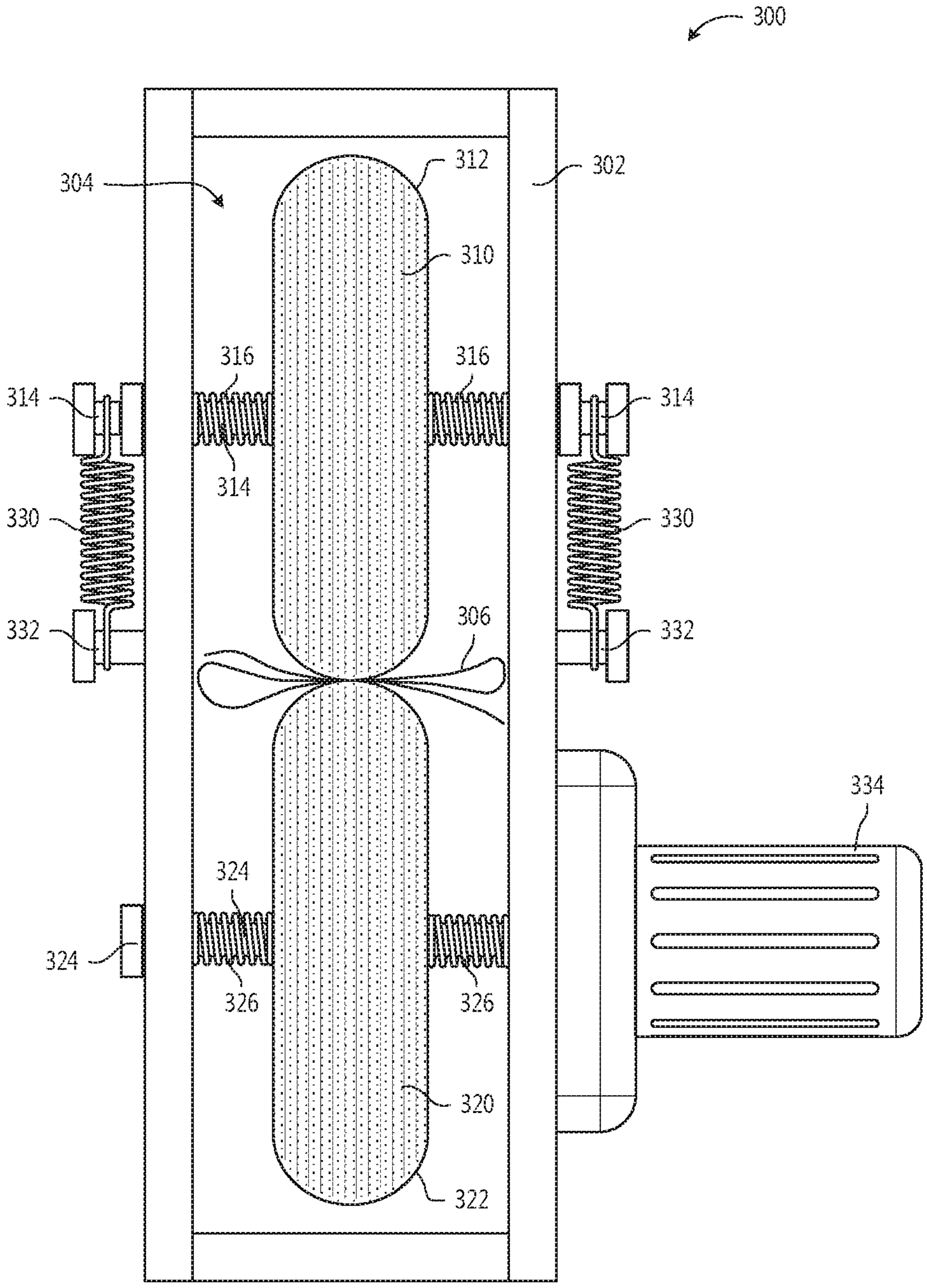
FIGS. 9A and 9B depict front and side views, respectively, of an embodiment of a conversion system that can be used in a dunnage conversion machine, in accordance with the embodiments discussed herein.
Figure 9B:
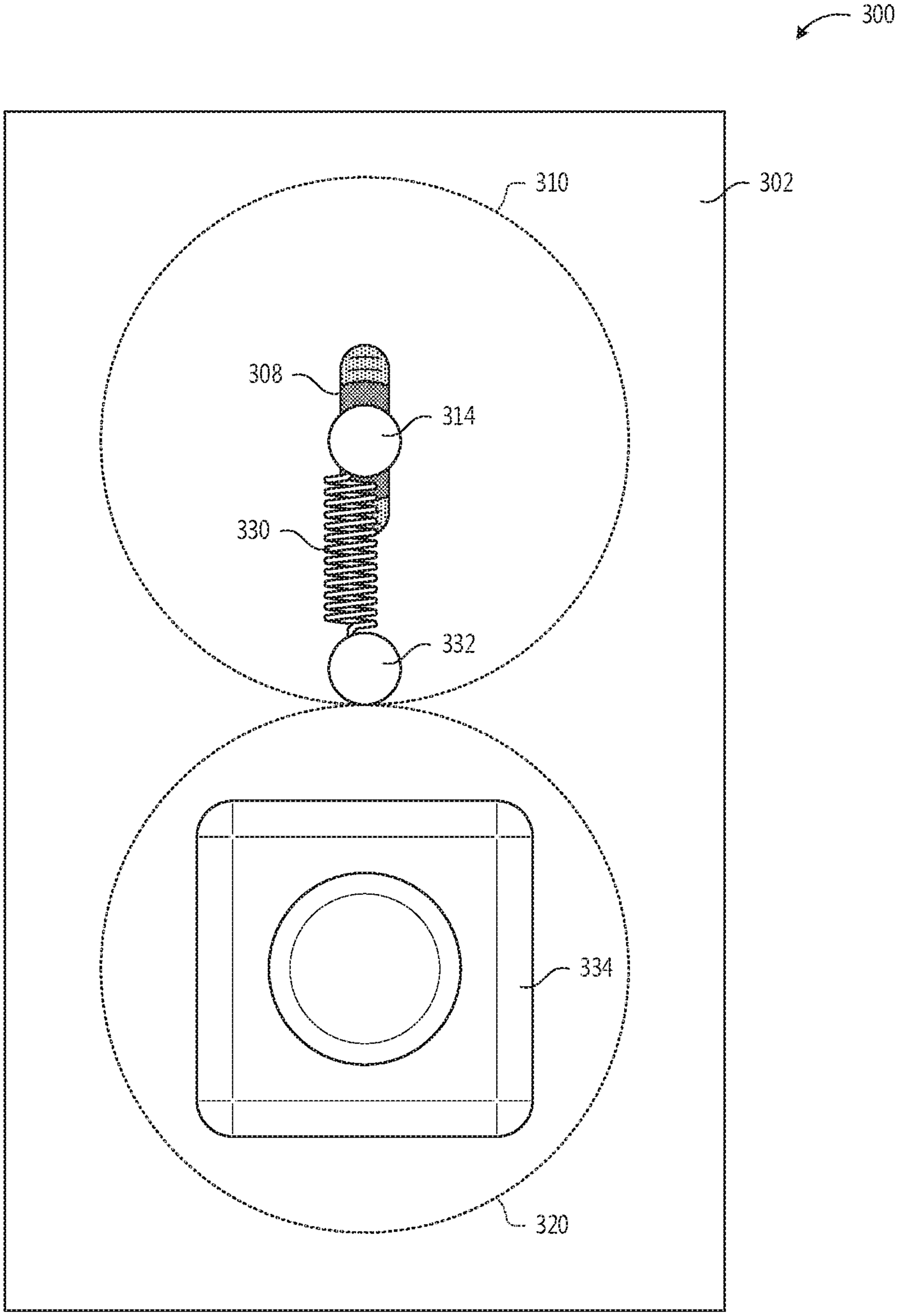

Depicted in FIGS. 9A and 9B are front and side views, respectively, of an embodiment of a conversion system 300 that can be used in a dunnage conversion machine. The conversion system 300 includes a frame 302 configured to hold components of a drive system 304. The drive system 304 is configured to draw a sheet material from a source of sheet material in the dunnage conversion machine. In some embodiments, the sheet material is paper, such as Kraft paper. In the depicted embodiment, one example of a profile 306 of the sheet material is depicted between a roller 310 and a roller 320. In some embodiments, the rollers 310 and 320 are molded elastomer wheels, such as molded urethane wheels. The roller 310 has a circumference with a curved profile 312 and the roller 320 has a circumference with a curved profile 322. When the sheet material is not located between the rollers 310 and 320, the curved profile 312 of the roller 310 contacts the curved profile 322 of the roller 320. When the sheet material is located between the rollers 310 and 320, the drive system 304 is configured to feed the sheet material through the drive system 304 by rotating at least one of the rollers 310 and 320. In the depicted embodiment, the profile 306 of the sheet material is arranged such that multiple plies of the sheet material pass between the rollers 310 and 320.

In the depicted embodiment, the drive system 304 includes an axle 314 of the roller 310 and an axle 324 of the roller 320. In the depicted embodiment, the axles 314 and 324 are substantially parallel to each other. In some embodiments, the roller 310 is configured to freely rotate with respect to the axle 314 and the roller 320 is not able to rotate with respect to the axle 324. In this way, the roller 320 can be driven by rotating the axle 324 and the roller 310 is capable of counterrotating with respect to the roller 320 when the roller 320 is driven. In the depicted embodiment, the axle 314 includes biasing mechanisms 316 that are located between one side of the roller 310 and the frame 302. In some instances, the biasing mechanisms 316 are configured to bias the roller 310 to a substantially centered position between sides of the frame 302. In the depicted embodiment, the axle 324 includes biasing mechanisms 326 that are located between one side of the roller 320 and the frame 302. In some instances, the biasing mechanisms 326 are configured to bias the roller 320 to a substantially centered position between sides of the frame 302. In the depicted embodiment, the rollers 310 and 320 are aligned such that, when the sheet material is not located between the rollers 310 and 320, a point on roller 310 that is in contact with the curved profile 322 of the roller 320 is on the maximum circumference of the roller 310 and a point on the roller 320 that is in contact with the curved profile 312 of the roller 310 is on the maximum circumference of the roller 320.

The conversion system 300 further includes biasing mechanisms 330 configured to bias the roller 310 toward the roller 320. In the depicted embodiment, the biasing mechanisms 330 are compression springs that extend between the axle 314 of the roller 310 and posts 332 that are fixedly coupled to the frame 302. In the embodiment depicted in FIGS. 9A and 9B, the axle 324 of the roller 320 is not capable of translational movement with respect to the frame 302. Thus, in the depicted embodiment, the biasing mechanisms 330 are coupled between the axle 314 of the roller 310 and the axle 324 of the roller 320 when the biasing mechanisms 330 extend between the axle 314 of the roller 310 and posts 332. The axle 314 of the roller 310 passes through a slot 308 in the frame 302 that permits translational movement of the axle 314. The slot 308 allows the roller 310 to be biased toward the roller 320 when no sheet material is located between the rollers 310 and 320. The slot 308 also allows the roller 310 to move away from the roller 320 when a sheet material passes between the rollers 310 and 320, particularly when multiple plies of the sheet material and or a deformed (e.g., folded or crumpled) sheet material passes between the rollers 310 and 320. In some embodiments, the biasing mechanisms 330 are configured to be disengaged while the sheet material is initially fed between the rollers 310 and 320. For example, the hooks of the compression springs can be removed from the axle 314 so that a user can manually lift the roller 310 while the user manually feeds the initial part of the sheet material through the rollers 310 and 320.

The conversion system 300 further includes a motor 334. In some embodiments, the motor can be an electric motor, a heat engine (e.g., a combustion engine), a chemically-powered motor, a pneumatic motor, a hydraulic motor, or any other type of motor or engine. In the depicted embodiment, the motor 334 is fixedly coupled to the frame 302. The motor 334 is configured to engage the axle 324 and, when the motor 334 is operating, to rotate the axle 324. In some embodiments, the roller 320 is not capable of rotating with respect to the axle 324 such that the roller 320 and the axle 324 rotate in response to the motor 334 driving the axle 324. In some embodiments, the motor 334 is communicatively coupled to a computing device (e.g., a controller) configured to control operation of the motor 334. For example, the computing device can control one or more of when the motor 334 operates, the speed at which the motor 334 operates, a torque generated by the motor 334, and the like.

In some embodiments, the conversion system 300 can be part of a dunnage conversion machine that also includes a source of the sheet material. The source of the sheet material can be a roll of the sheet material, a fanfolded stack of the sheet material, or any other source. The sheet material is in a substantially flat configuration in the source. The conversion system 300 is configured to feed the sheet material from the source and through the drive system 304. The conversion system 300 is also configured to convert the sheet material from the substantially flat configuration into a non-flat configuration. In some embodiments, the drive system 304 alone is capable of convert the sheet material from the substantially flat configuration into the non-flat configuration. In some embodiments, the conversion system 300 includes other components, such as a funneling device or other tortuous path component, configured to deform the sheet material from the substantially flat configuration as the sheet material is fed from the source to the drive system 304. In embodiments where the rollers 310 and 320 are elastomer wheels, the friction between the sheet material and the elastomer material of the rollers 310 and 320 can increase the effectiveness of drive system 304 to feed the sheet material through the conversion system 300.

Figure 10A:
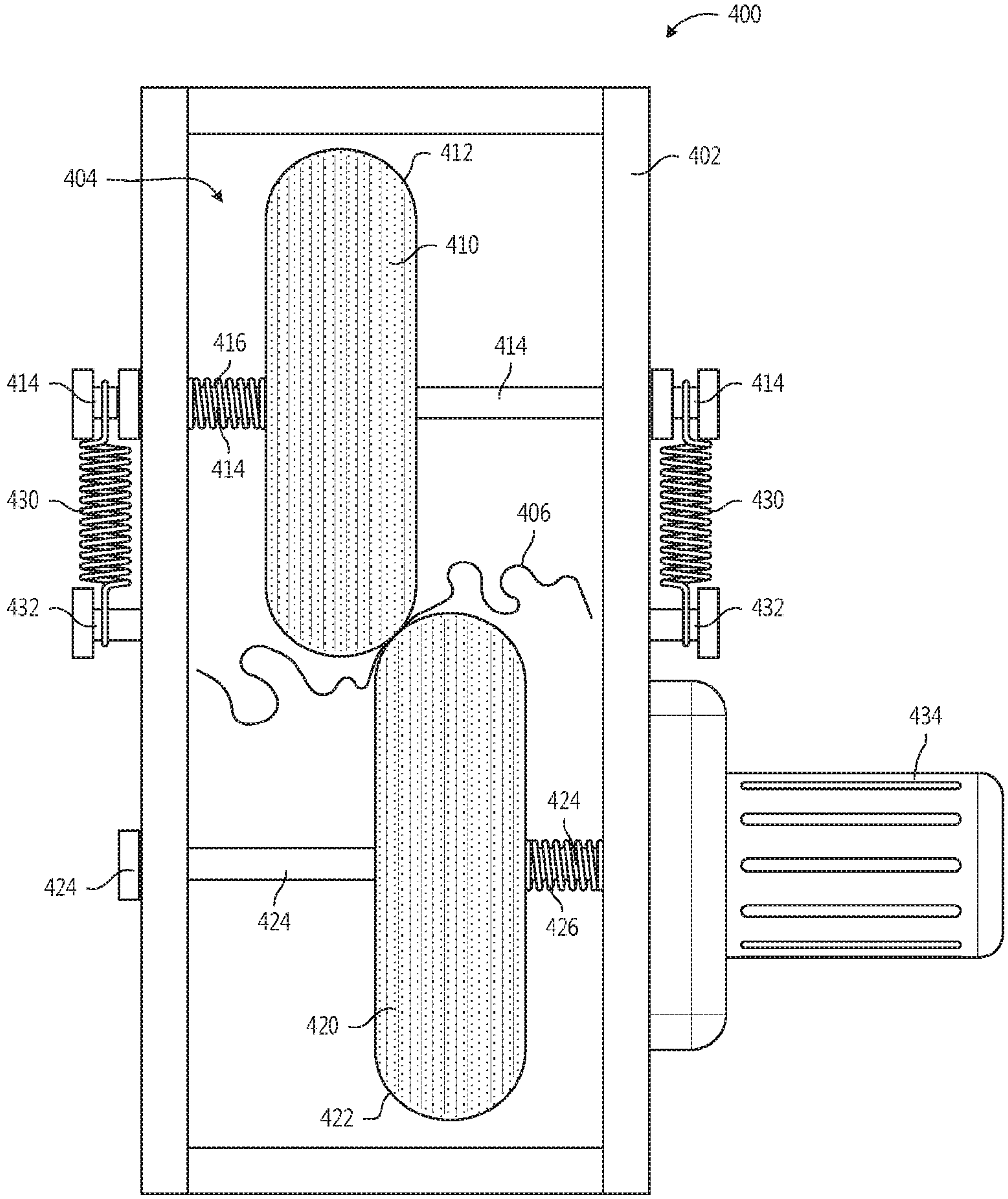
FIGS. 10A and 10B depict front and side views, respectively, of another embodiment of a conversion system that can be used in a dunnage conversion machine, in accordance with the embodiments discussed herein.
Figure 10B:
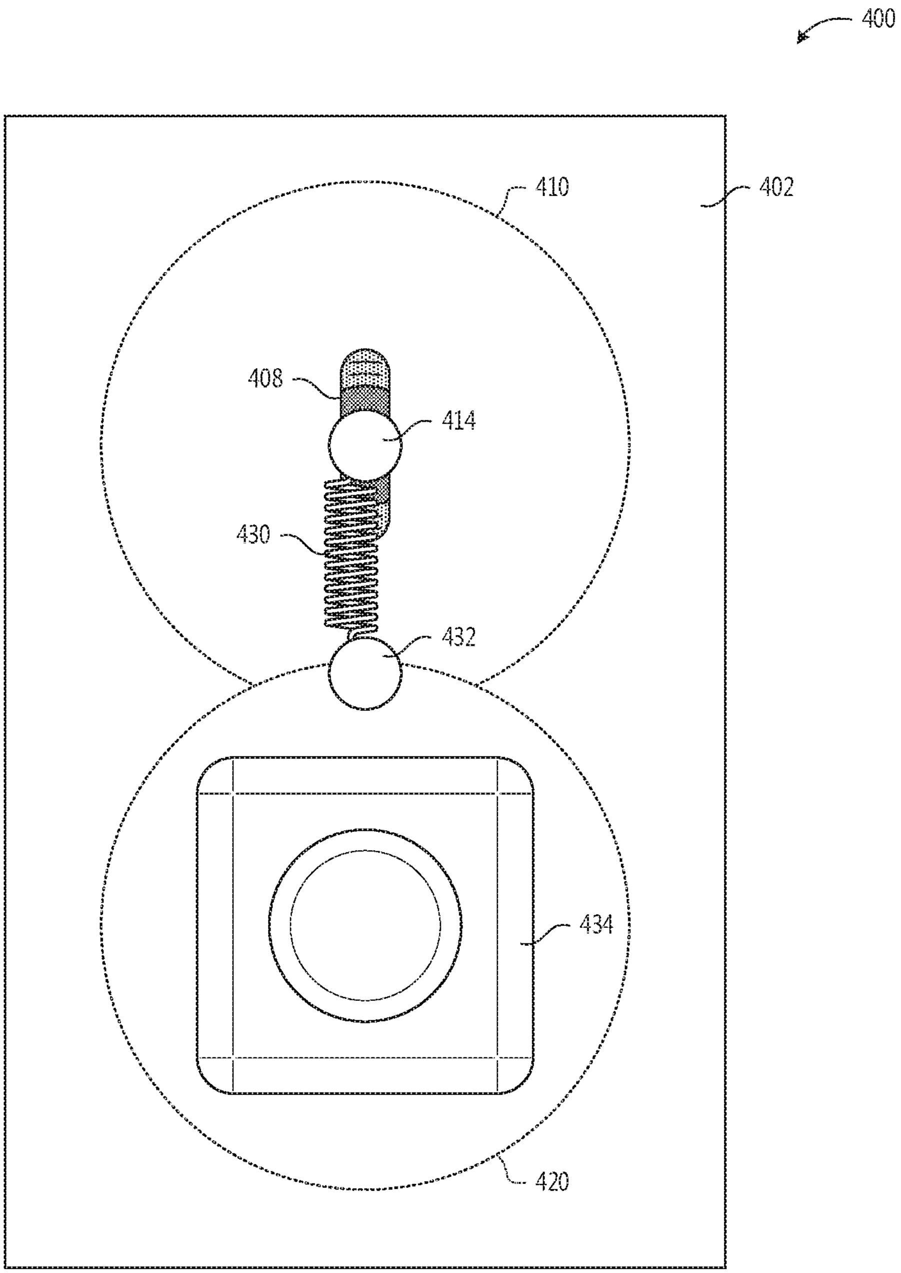

Depicted in FIGS. 10A and 10B are front and side views, respectively, of another embodiment of a conversion system 400 that can be used in a dunnage conversion machine. The conversion system 400 includes a frame 402 configured to hold components of a drive system 404. The drive system 404 is configured to draw a sheet material from a source of sheet material in the dunnage conversion machine. In some embodiments, the sheet material is paper, such as Kraft paper. In the depicted embodiment, one example of a profile 406 of the sheet material is depicted between a roller 410 and a roller 420. In some embodiments, the rollers 410 and 420 are molded elastomer wheels, such as molded urethane wheels. The roller 410 has a circumference with a curved profile 412 and the roller 420 has a circumference with a curved profile 422. When the sheet material is not located between the rollers 410 and 420, the curved profile 412 of the roller 410 contacts the curved profile 422 of the roller 420. When the sheet material is located between the rollers 410 and 420, the drive system 404 is configured to feed the sheet material through the drive system 404 by rotating at least one of the rollers 410 and 420. In the depicted embodiment, the profile 406 of the sheet material is arranged such that a single ply of the sheet material passes between the rollers 410 and 420 and portions of the sheet on either side of the rollers 410 and 420 are somewhat deformed.

In the depicted embodiment, the drive system 404 includes an axle 414 of the roller 410 and an axle 424 of the roller 420. In the depicted embodiment, the axles 414 and 424 are substantially parallel to each other. In some embodiments, the roller 410 is configured to freely rotate with respect to the axle 414 and the roller 420 is not able to rotate with respect to the axle 424. In this way, the roller 420 can be driven by rotating the axle 424 and the roller 410 is capable of counterrotating with respect to the roller 420 when the roller 420 is driven. In the depicted embodiment, the axle 414 includes a biasing mechanism 416 that is located between one side of the roller 410 and the frame 402. In the depicted embodiment, the biasing mechanism 416 is configured to bias the roller 410 axially along the axle 414 toward the roller 420. In the depicted embodiment, the axle 424 includes a biasing mechanism 426 that is located between one side of the roller 420 and the frame 402. In the depicted embodiment, the biasing mechanism 416 is configured to bias the roller 420 axially along the axle 424 toward the roller 410. In the depicted embodiment, the rollers 410 and 420 are offset such that, when the sheet material is not located between the rollers 410 and 420, a point on roller 410 that is in contact with the curved profile 422 of the roller 420 is on not on the maximum circumference of the roller 410 and a point on the roller 420 that is in contact with the curved profile 412 of the roller 410 is not on the maximum circumference of the roller 420.

The conversion system 400 further includes biasing mechanisms 430 configured to bias the roller 410 toward the roller 420. In the depicted embodiment, the biasing mechanisms 430 are compression springs that extend between the axle 414 of the roller 410 and posts 432 that are fixedly coupled to the frame 402. In the embodiment depicted in FIGS. 10A and 10B, the axle 424 of the roller 420 is not capable of translational movement with respect to the frame 402. Thus, in the depicted embodiment, the biasing mechanisms 430 are coupled between the axle 414 of the roller 410 and the axle 424 of the roller 420 when the biasing mechanisms 430 extend between the axle 414 of the roller 410 and posts 432. The axle 414 of the roller 410 passes through a slot 408 in the frame 402 that permits translational movement of the axle 414. The slot 408 allows the roller 410 to be biased toward the roller 420 when no sheet material is located between the rollers 410 and 420. The slot 408 also allows the roller 410 to move away from the roller 420 when a sheet material passes between the rollers 410 and 420, particularly when multiple plies of the sheet material and/or a deformed (e.g., folded or crumpled) sheet material passes between the rollers 410 and 420. In some embodiments, the biasing mechanisms 430 are configured to be disengaged while the sheet material is initially fed between the rollers 410 and 420. For example, the hooks of the compression springs can be removed from the axle 414 so that a user can manually lift the roller 410 while the user manually feeds the initial part of the sheet material through the rollers 410 and 420.

The conversion system 400 further includes a motor 434. In some embodiments, the motor can be an electric motor, a heat engine (e.g., a combustion engine), a chemically-powered motor, a pneumatic motor, a hydraulic motor, or any other type of motor or engine. In the depicted embodiment, the motor 434 is fixedly coupled to the frame 402. The motor 434 is configured to engage the axle 424 and, when the motor 434 is operating, to rotate the axle 424. In some embodiments, the roller 420 is not capable of rotating with respect to the axle 424 such that the roller 420 and the axle 424 rotate in response to the motor 434 driving the axle 424. In some embodiments, the motor 434 is communicatively coupled to a computing device (e.g., a controller) configured to control operation of the motor 434. For example, the computing device can control one or more of when the motor 434 operates, the speed at which the motor 434 operates, a torque generated by the motor 434, and the like.

In some embodiments, the conversion system 400 can be part of a dunnage conversion machine that also includes a source of the sheet material. The source of the sheet material can be a roll of the sheet material, a fanfolded stack of the sheet material, or any other source. The sheet material is in a substantially flat configuration in the source. The conversion system 400 is configured to feed the sheet material from the source and through the drive system 404. The conversion system 400 is also configured to convert the sheet material from the substantially flat configuration into a non-flat configuration. In some embodiments, the drive system 404 alone is capable of convert the sheet material from the substantially flat configuration into the non-flat configuration. In some embodiments, the conversion system 400 includes other components, such as a funneling device or other tortuous path component, configured to deform the sheet material from the substantially flat configuration as the sheet material is fed from the source to the drive system 404. In embodiments where the rollers 410 and 420 are elastomer wheels, the friction between the sheet material and the elastomer material of the rollers 410 and 420 can increase the effectiveness of drive system 404 to feed the sheet material through the conversion system 400.

Figure 11A:
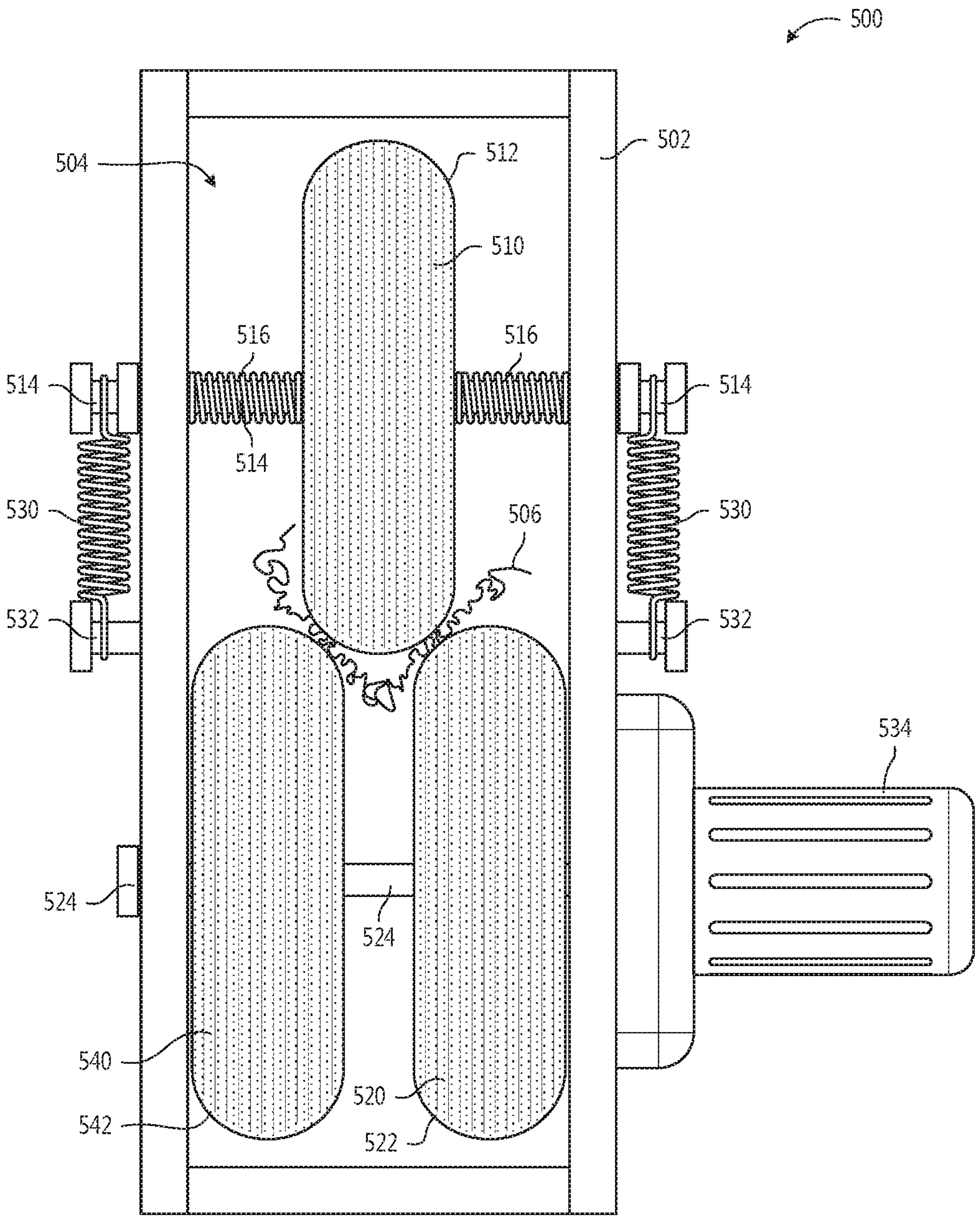
FIGS. 11A and 11B depict front and side views, respectively, of yet another embodiment of a conversion system that can be used in a dunnage conversion machine, in accordance with the embodiments discussed herein.
Figure 11B:
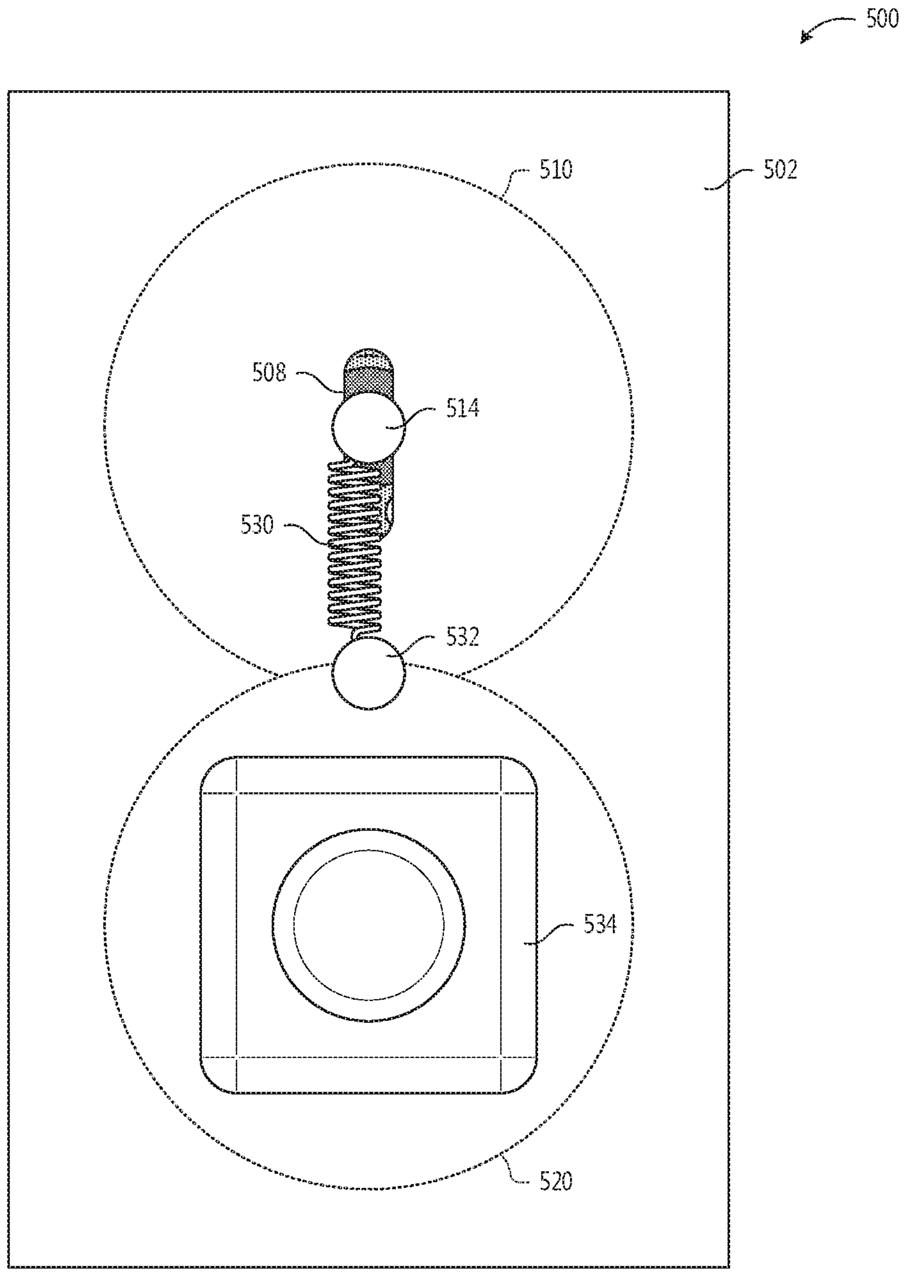

Depicted in FIGS. 11A and 11B are front and side views, respectively, of another embodiment of a conversion system 500 that can be used in a dunnage conversion machine. The conversion system 500 includes a frame 502 configured to hold components of a drive system 504. The drive system 504 is configured to draw a sheet material from a source of sheet material in the dunnage conversion machine. In some embodiments, the sheet material is paper, such as Kraft paper. In the depicted embodiment, one example of a profile 506 of the sheet material is depicted between a roller 510 and rollers 520 and 540. In some embodiments, the rollers 510, 520, and 540 are molded elastomer wheels, such as molded urethane wheels. The roller 510 has a circumference with a curved profile 512, the roller 520 has a circumference with a curved profile 522, and the roller 540 has a circumference with a curved profile 542. When the sheet material is not located between the roller 510 and the rollers 520 and 540, the curved profile 512 of the roller 510 contacts the curved profiles 522 and 542 of the rollers 520 and 540, respectively. When the sheet material is located between the roller 510 and the rollers 520 and 540, the drive system 504 is configured to feed the sheet material through the drive system 504 by rotating at least one of the rollers 510, 520, and 540. In the depicted embodiment, the profile 506 of the sheet material is arranged such that a single ply of the sheet material passes between the roller 510 and the rollers 520 and 540 and portions of the sheet between the roller 510 and the rollers 520 and 540 are somewhat deformed.

In the depicted embodiment, the drive system 504 includes an axle 514 of the roller 510 and an axle 524 of the rollers 520 and 540. In the depicted embodiment, the axles 514 and 524 are substantially parallel to each other. In some embodiments, the roller 510 is configured to freely rotate with respect to the axle 514 and the rollers 520 and 540 are not able to rotate with respect to the axle 524. In this way, the rollers 520 and 540 can be driven by rotating the axle 524 and the roller 510 is capable of counterrotating with respect to the rollers 520 and 540 when the rollers 520 and 540 are driven. In the depicted embodiment, the axle 514 includes biasing mechanisms 516 that are located between one side of the roller 510 and the frame 502. In some instances, the biasing mechanisms 516 are configured to bias the roller 510 to a substantially centered position between sides of the frame 502. In the depicted embodiment, the roller 510 is offset with respect to the rollers 520 and 540 such that, when the sheet material is not located between the roller 510 and the rollers 520, (i) a point on roller 510 that is in contact with the curved profile 522 of the roller 520 is on not on the maximum circumference of the roller 510, (ii) a point on the roller 520 that is in contact with the curved profile 512 of the roller 510 is not on the maximum circumference of the roller 520, (iii) a point on roller 510 that is in contact with the curved profile 542 of the roller 540 is on not on the maximum circumference of the roller 510, (iv) a point on the roller 540 that is in contact with the curved profile 512 of the roller 510 is not on the maximum circumference of the roller 540. In addition, when the sheet material is not located between the roller 510 and the rollers 520 and 540, the curved profiles 522 and 542 contact the curved profile 512 on opposite sides of the maximum circumference of the roller 510. This orientation may aid in the centering of the roller 510 between the rollers 520 and 540.

The conversion system 500 further includes biasing mechanisms 530 configured to bias the roller 510 toward the roller 520. In the depicted embodiment, the biasing mechanisms 530 are compression springs that extend between the axle 514 of the roller 510 and posts 532 that are fixedly coupled to the frame 502. In the embodiment depicted in FIGS. 10A and 10B, the axle 524 of the rollers 520 and 540 is not capable of translational movement with respect to the frame 502. Thus, in the depicted embodiment, the biasing mechanisms 530 are coupled between the axle 514 of the roller 510 and the axle 524 of the roller 520 when the biasing mechanisms 530 extend between the axle 514 of the roller 510 and posts 532. The axle 514 of the roller 510 passes through a slot 508 in the frame 502 that permits translational movement of the axle 514. The slot 508 allows the roller 510 to be biased toward the rollers 520 and 540 when no sheet material is located between the rollers 510 and 520. The slot 508 also allows the roller 510 to move away from the rollers 520 and 540 when a sheet material passes between the roller 510 and the rollers 520 and 540, particularly when multiple plies of the sheet material and/or a deformed (e.g., folded or crumpled) sheet material passes between the roller 510 and the rollers 520 and 540. In some embodiments, the biasing mechanisms 530 are configured to be disengaged while the sheet material is initially fed between the roller 510 and the rollers 520 and 540. For example, the hooks of the compression springs can be removed from the axle 514 so that a user can manually lift the roller 510 while the user manually feeds the initial part of the sheet material through the roller 510 and the rollers 520 and 540.

The conversion system 500 further includes a motor 534. In some embodiments, the motor can be an electric motor, a heat engine (e.g., a combustion engine), a chemically-powered motor, a pneumatic motor, a hydraulic motor, or any other type of motor or engine. In the depicted embodiment, the motor 534 is fixedly coupled to the frame 502. The motor 534 is configured to engage the axle 524 and, when the motor 534 is operating, to rotate the axle 524. In some embodiments, the rollers 520 and 540 are not capable of rotating with respect to the axle 524 such that the rollers 520 and 540 and the axle 524 rotate in response to the motor 534 driving the axle 524. In some embodiments, the motor 534 is communicatively coupled to a computing device (e.g., a controller) configured to control operation of the motor 534. For example, the computing device can control one or more of when the motor 534 operates, the speed at which the motor 534 operates, a torque generated by the motor 534, and the like.

In some embodiments, the conversion system 500 can be part of a dunnage conversion machine that also includes a source of the sheet material. The source of the sheet material can be a roll of the sheet material, a fanfolded stack of the sheet material, or any other source. The sheet material is in a substantially flat configuration in the source. The conversion system 500 is configured to feed the sheet material from the source and through the drive system 504. The conversion system 500 is also configured to convert the sheet material from the substantially flat configuration into a non-flat configuration. In some embodiments, the drive system 504 alone is capable of convert the sheet material from the substantially flat configuration into the non-flat configuration. In some embodiments, the conversion system 500 includes other components, such as a funneling device or other tortuous path component, configured to deform the sheet material from the substantially flat configuration as the sheet material is fed from the source to the drive system 504. In embodiments where the rollers 510 and 520 are elastomer wheels, the friction between the sheet material and the elastomer material of the rollers 510 and 520 can increase the effectiveness of drive system 504 to feed the sheet material through the conversion system 500.

Figure 12:
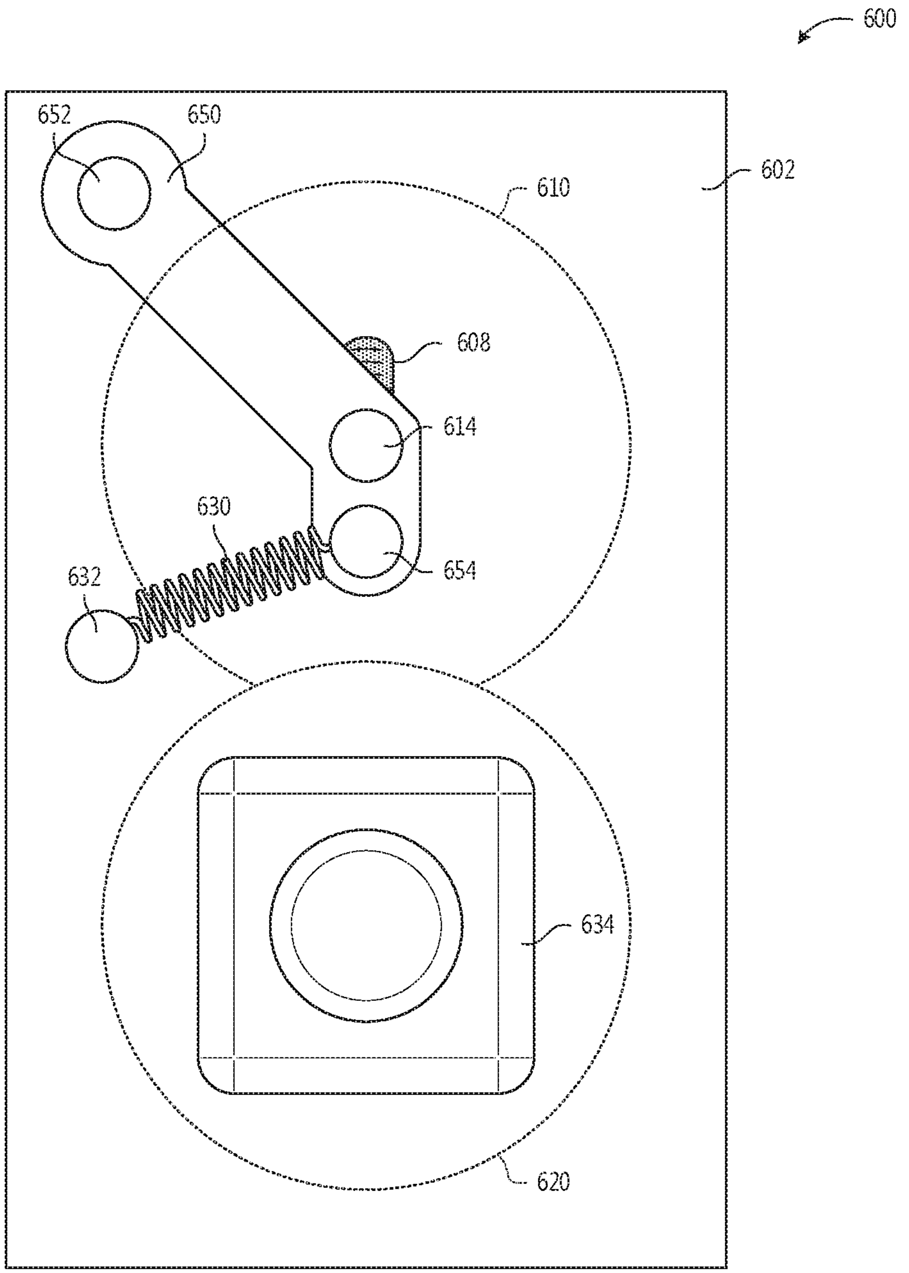
FIG. 12 depicts a side view of an embodiment of a conversion system 600 with a biasing mechanism arrangement that can be used in any of the embodiments of conversion systems disclosed herein to bias one roller toward another, in accordance with the embodiments discussed herein.

Depicted in FIG. 12 is a side view of an embodiment of a conversion system 600 with a biasing mechanism arrangement that can be used in any of the embodiments of conversion systems disclosed herein to bias one roller toward another. The conversion system 600 includes a frame 602 configured to hold components of a drive system. The drive system includes rollers 610 and 620. The roller 610 has a circumference with a curved profile and the roller 620 has a circumference with a curved profile. When a sheet material is not located between the rollers 610 and 620, the curved profile of the roller 610 contacts the curved profile of the roller 620. In the depicted embodiment, the drive system includes an axle 614 of the roller 610 and an axle (not visible) of the roller 620. The conversion system 600 also includes a motor 634 configured to drive the axle of the roller 620.

The conversion system 600 further includes a biasing mechanism 630 configured to bias the roller 610 toward the roller 620. In the depicted embodiment, the biasing mechanism 630 is a compression spring that extends between a lever arm 650 and a post 632 that is fixedly coupled to the frame 602. The lever arm 650 is configured to pivot with respect to the frame 602. In the depicted embodiment, the lever arm 650 is fixedly coupled to a shaft 652 that passed through bores in the frame 602. In some embodiments, the shaft 652 passes through two sides of the frame 602 and the end of the shaft not shown in FIG. 12 is fixedly coupled to another lever arm on the other side of the frame 602. The axle 614 is coupled to the lever arm 650. In embodiments where another lever arm is located on the other side of the frame 602, the other end of the shaft is coupled to the other lever arm. The lever arm 650 further includes a post 654 and the biasing mechanism 630 is coupled between the post 654 and the post 632. In embodiments where another lever arm is located on the other side of the frame 602, the other lever arm can include a post and another biasing mechanism can be coupled between the post on the other lever arm and a post on the other side of the frame 602.

In the embodiment depicted in FIG. 12, the axle of the roller 620 is not capable of translational movement with respect to the frame 602. Thus, in the depicted embodiment, the biasing mechanism 630 is coupled between the axle 614 of the roller 610 and the axle of the roller 620 when the biasing mechanism 630 extend between the post 654 of the post 632. The axle 614 of the roller 610 passes through a slot 608 in the frame 602 that permits translational movement of the axle 614. The slot 308 allows the roller 610 to be biased toward the roller 620 when no sheet material is located between the rollers 610 and 620. The slot 608 also allows the roller 610 to move away from the roller 620 when a sheet material passes between the rollers 610 and 620, particularly when multiple plies of the sheet material and or a deformed (e.g., folded or crumpled) sheet material passes between the rollers 610 and 620. In some embodiments, the slot 608 can have an arcuate shape based on the path of motion of the axle 614 when the lever arm 650 pivots about the shaft 652. In some embodiments, the biasing mechanisms 630 are configured to be disengaged while the sheet material is initially fed between the rollers 610 and 620. For example, the hooks of the compression springs can be removed from the post 654 and/or the post 632 so that a user can manually lift the roller 610 while the user manually feeds the initial part of the sheet material through the rollers 610 and 620. It will be apparent that the arrangement of the lever arm 650 and the biasing mechanism 630 could replace biasing mechanisms that bias one roller toward the other in other embodiments of conversion systems disclosed herein.

For purposes of this disclosure, terminology such as “upper,” “lower,” “vertical,” “horizontal,” “inwardly,” “outwardly,” “inner,” “outer,” “front,” “rear,” and the like, should be construed as descriptive and not limiting the scope of the claimed subject matter. Further, the use of “including,” “comprising,” or “having” and variations thereof herein is meant to encompass the items listed thereafter and equivalents thereof as well as additional items. Unless limited otherwise, the terms “connected,” “coupled,” and “mounted” and variations thereof herein are used broadly and encompass direct and indirect connections, couplings, and mountings. Unless stated otherwise, the terms “substantially,” “approximately,” and the like are used to mean within 5% of a target value.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

What is claimed is:

1. A dunnage conversion machine, comprising:

a source of sheet material, wherein the sheet material is in a substantially flat configuration in the source of the sheet material; and a conversion system configured to convert the sheet material from the substantially flat configuration into a non-flat configuration, wherein:

the conversion system includes a drive system configured to draw the sheet material from the source and through the conversion system, the drive system comprises a first roller and a second roller, a circumference of the first roller has a first curved profile, a circumference of the second roller has a second curved profile, the first and second rollers are arranged such that, when the sheet material is not located between the first and second rollers, the first curved profile of the first roller contacts the second curved profile of the second roller, when the sheet material is located between the first and second rollers, the drive system is configured to feed the sheet material through the drive system by rotating at least one of the first and second rollers, the first and second curved profiles of the first and second rollers are convex, and the first and second rollers are offset such that, when the sheet material is not located between the first and second rollers, a point on first roller that is in contact with the second curved profile of the second roller is not on the maximum circumference of the first roller and a point on the second roller that is in contact with the first curved profile of the first roller is not on the maximum circumference of the second roller.

2. The dunnage conversion machine of claim 1, wherein the first and second rollers are molded elastomer wheels.

3. The dunnage conversion machine of claim 2, wherein the molded elastomer wheels are molded urethane wheels.

4. The dunnage conversion machine of claim 1, further comprising:

a biasing mechanism that biases the first roller toward the second roller.

5. The dunnage conversion machine of claim 4, wherein the biasing mechanism includes a compression spring coupled between an axle of the first roller and an axle of the second roller.

6. The dunnage conversion machine of claim 5, wherein the axle of the first roller is capable of moving with respect to the axle of the second roller such that the axles of the first and second rollers remain substantially parallel to each other.

7. The dunnage conversion machine of claim 6, wherein the axle of the first roller is capable of moving with respect to the axle of the second roller within a range that permits multiple plies of the sheet material to pass between the first roller and the second roller.

8. The dunnage conversion machine of claim 5, wherein the axle of the second roller is coupled to a motor, and wherein the motor is configured to drive rotation of the axle of the second roller and rotation of the second roller.

9. The dunnage conversion machine of claim 8, wherein the first roller is capable of spinning freely, and wherein a force imparted by the biasing mechanism on the axle of the first roller causes the first roller to contact one of the sheet material or the second roller such that the first and second rollers counterrotate when rotation of the second roller is driven by the motor.

10. The dunnage conversion machine of claim 4, wherein the biasing mechanism is capable of being disengaged while the sheet material is initially fed between the first and second rollers.

11. The dunnage conversion machine of claim 1, wherein, when the sheet material is not located between the first and second rollers, a point on first roller that is in contact with the second curved profile of the second roller is tangent to a two-dimensional tangent plane and a point on the second roller that is in contact with the first curved profile of the first roller is tangent to the two-dimensional tangent plane.

12. The dunnage conversion machine of claim 11, wherein the two-dimensional tangent plane is substantially perpendicular to an axis plane, wherein the axis plane passes through an axis of the first roller and an axis of the second roller.

13. The dunnage conversion machine of claim 1, wherein the sheet material is Kraft paper.

14. The dunnage conversion machine of claim 13, wherein, in the source of the sheet material, the Kraft paper is either in a fanfolded stack or on a roll.

15. A drive system for feeding a sheet material, the drive system comprising:

a first roller, wherein a circumference of the first roller has a first curved profile; and a second roller, wherein a circumference of the second roller has a second curved profile;

wherein the first and second rollers are arranged such that:

when the sheet material is not located between the first and second rollers, the first curved profile of the first roller contacts the second curved profile of the second roller, and when the sheet material is located between the first and second rollers, rotation of at least one of the first and second rollers causes the sheet material to be fed through the drive system;

wherein the first and second curved profiles of the first and second rollers are convex; and wherein the first and second rollers are offset such that, when the sheet material is not located between the first and second rollers, a point on first roller that is in contact with the second curved profile of the second roller is not on the maximum circumference of the first roller and a point on the second roller that is in contact with the first curved profile of the first roller is not on the maximum circumference of the second roller.

16. The drive system of claim 15, wherein the first roller is on a first axle and the second roller is on a second axle, the drive system further comprising:

a third roller on the second axle, wherein a circumference of the third roller has a third curved profile;

wherein the first and third rollers are arranged such that, when the sheet material is not located between the first and third rollers, the first curved profile of the first roller contacts the third curved profile of the third roller.

17. The drive system of claim 16, wherein, when the sheet material is not located between the first roller and the second and third rollers, the second and third curved profiles contact the first curved profile on opposite sides of the maximum circumference of the first roller.

18. The drive system of claim 16, wherein the first and second axles are substantially parallel to each other.

19. The drive system of claim 15, further comprising:

a biasing mechanism that biases the first roller toward the second roller.

20. The drive system of claim 15, wherein the first and second rollers are molded elastomer wheels.

* * * * *